(12) United States Patent
Zhou

(10) Patent No.: US 11,533,643 B2
(45) Date of Patent: Dec. 20, 2022

(54) QUALITY OF SERVICE MONITORING METHOD AND SYSTEM, AND DEVICE

(71) Applicant: HUAWEI TECHNOLOGIES CO., LTD., Guangdong (CN)

(72) Inventor: Han Zhou, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 17/100,395

(22) Filed: Nov. 20, 2020

(65) Prior Publication Data

US 2021/0076238 A1 Mar. 11, 2021

Related U.S. Application Data

(63) Continuation of application No. PCT/CN2019/083662, filed on Apr. 22, 2019.

(30) Foreign Application Priority Data

May 21, 2018 (CN) .......................... 201810490079.9

(51) Int. Cl.
*H04W 24/08* (2009.01)
*H04W 76/11* (2018.01)
(Continued)

(52) U.S. Cl.
CPC ....... *H04W 24/08* (2013.01); *H04W 28/0268* (2013.01); *H04W 48/16* (2013.01); *H04W 76/11* (2018.02)

(58) Field of Classification Search
CPC . H04W 24/08; H04W 28/0268; H04W 48/16; H04W 76/11; H04W 76/15; H04L 41/5009; H04L 43/08
See application file for complete search history.

(56) References Cited

U.S. PATENT DOCUMENTS

| 8,824,285 B1 | 9/2014 | Reith, III |
| 2013/0064083 A1 | 3/2013 | Babbar et al. |

(Continued)

FOREIGN PATENT DOCUMENTS

| CN | 103119981 A | 5/2013 |
| CN | 104812001 A | 7/2015 |

(Continued)

OTHER PUBLICATIONS

3GPP TS 23.501 V15.1.0 (Mar. 2018), "3rd Generation Partnership Project;Technical Specification Group Services and System Aspects;System Architecture for the 5G System;Stage 2(Release 15)," Mar. 2018, 201 pages.
3GPP TR 23. 793 V0.4.0 (Apr. 2018), "3rd Generation Partnership Project;Technical Specification Group Services and System Aspects;Study on Access Traffic Steering, Switching and Splitting support in the SG system architecture (Release 16)," Apr. 2018, 58 pages.

(Continued)

*Primary Examiner* — Peter P Chau
(74) *Attorney, Agent, or Firm* — Fish & Richardson P.C.

(57) ABSTRACT

This application provides quality of service monitoring methods, systems, and devices for monitoring quality of service of communication links. One method comprises: obtaining an identifier of a service flow of a terminal device, a quality of service monitoring parameter of a communication link for transmitting the service flow, and correlation information associated with the communication link, the correlation information correlates the identifier of the service flow with an access type adopted by the communication link, wherein the access type is a 3rd generation partnership project (3GPP) access or a non-3GPP access; and monitoring the quality of service of the communication link for the access type based on the identifier of the service flow, the quality of service monitoring parameter, and the correlation information.

20 Claims, 11 Drawing Sheets

(51) Int. Cl.
*H04W 28/02* (2009.01)
*H04W 48/16* (2009.01)

(56) References Cited

U.S. PATENT DOCUMENTS

| | | | | |
|---|---|---|---|---|
| 2014/0204758 A1* | 7/2014 | Zhu | ................ | H04W 40/248 |
| | | | | 370/235 |
| 2017/0374579 A1* | 12/2017 | Wang | ................ | H04L 47/30 |
| 2018/0199228 A1 | 7/2018 | Van Phan et al. | | |
| 2018/0368047 A1* | 12/2018 | Patil | ................ | H04L 45/24 |
| 2019/0274178 A1* | 9/2019 | Salkintzis | ................ | H04W 12/03 |

FOREIGN PATENT DOCUMENTS

| | | | |
|---|---|---|---|
| CN | 105682146 A | 6/2016 |
| CN | 105828376 A | 8/2016 |
| CN | 107710812 A | 2/2018 |
| CN | 107873126 A | 4/2018 |
| CN | 108353258 A | 7/2018 |
| JP | 2004328753 A | 11/2004 |
| JP | 2017519464 A | 7/2017 |
| RU | 81024 U1 | 2/2009 |
| RU | 2496260 C2 | 10/2013 |
| WO | 2015143607 A1 | 10/2015 |
| WO | 2017052432 A1 | 3/2017 |
| WO | 2017152936 A1 | 9/2017 |
| WO | 2018070436 A1 | 4/2018 |

OTHER PUBLICATIONS

3GPP TS 23.502 V15.1.0 (Mar. 2018), "3rd Generation Partnership Project;Technical Specification Group Services and System Aspects;Procedures for the 5G System;Stage 2(Release 15)," Mar. 2018, 285 pages.

Extended European Search Report issued in European Application No. 19807339.7 dated May 26, 2021, 8 pages.

Motorola Mobility et al., "Traffic steering with ATSSS policy," SA WG2 Meeting #127, S2-184120, Sanya, P.R. China, Apr. 16-20, 2018, 10 pages.

Nokia et al., "23.793: ATSSS assumptions," SA WG2 Meeting #122b, S2-175481, Sophia Antipolis, France, Aug. 21-25, 2017, 1 page.

Office Action issued in Chinese Application No. 201810490079.9 dated Apr. 26, 2020, 9 pages (with English translation).

PCT International Search Report and Written Opinion issued in International Application No. PCT/CN2019/083662 dated Jul. 1, 2019, 17 pages (with English translation).

Office Action issued in Russian Application No. 2020141738/07(077529) dated May 12, 2022, 11 pages (with English translation).

Office Action issued in Japanese Application No. 2020-565340 dated Jul. 12, 2022, 5 pages (with English translation).

* cited by examiner

QUALITY OF SERVICE MONITORING METHOD AND SYSTEM, AND DEVICE

CROSS-REFERENCE TO RELATED APPLICATIONS

This application is a continuation of International Application No. PCT/CN2019/083662, filed on Apr. 22, 2019, which claims priority to Chinese Patent Application No. 201810490079.9, filed on May 21, 2018. The disclosures of the aforementioned applications are hereby incorporated by reference in their entirety.

TECHNICAL FIELD

This application relates to the field of communications technologies, and in particular, to a quality of service monitoring method and system, and a device.

BACKGROUND

To face challenges from wireless broadband technologies and ensure a leading position of a 3rd generation partnership project (3GPP) network, the 3GPP standard organization formulated a network architecture of a next generation mobile communications system (next generation system) at the end of 2016, which is referred to as a 5th generation (5G) network architecture. This architecture supports both access to a 5G core network by using a wireless technology defined in the 3GPP standard organization and access to the 5G core network by using a non-3GPP (N3G) access technology. In other words, there may be a dual-access scenario or even a multi-access scenario in the 5G network architecture.

In addition, in the 5G network architecture, an ultra-reliable low-latency communication (URLLC) scenario is defined, and mainly includes services having low-latency and high-reliability connection requirements, for example, an unmanned driving service and an industrial automation service. The requirements in the foregoing scenario may be met by using an advanced air interface technology and an optimized core network architecture of a 5G network. However, in the 5G network, a bottom-layer link, an upper-layer routing protocol, and the like are all instable to some extent. In addition, a delay, an error, or even a network fault is always inevitable from the perspective of network construction. However, the foregoing scenario mostly relates to a service related to life safety or production safety, and an error is not allowed. Therefore, when the 5G network is used to serve the foregoing industry sensitive to life safety or production safety, quality of service needs to be monitored in real time in the 5G network. In this way, when the quality of service does not meet a preset condition, a corresponding adjustment operation or protection operation may be performed. In a current quality of service monitoring method, a monitoring packet and a monitored service packet are sent on a same link, so that link quality of the link can be correctly reflected based on quality of service of the link. In addition, the monitoring packet can be used to monitor quality of service of only one link at a time, instead of simultaneously monitoring quality of service of a plurality of links.

However, in a multi-access scenario, in other words, in a scenario in which there are a plurality of available links for one service, if quality of service is monitored by using the foregoing quality monitoring method, a policy decision cannot be provided for a service flow during multi-access handover.

Therefore, currently, how to monitor quality of service of a multi-access link in a multi-access scenario is a problem urgently to be resolved.

SUMMARY

Embodiments of this application provide a quality of service monitoring method and system, and a device, to monitor quality of service of a multi-access link in a multi-access scenario.

To achieve the foregoing objective, the following technical solutions are used in the embodiments of this application.

According to a first aspect, a quality of service monitoring method is provided. The method includes: obtaining, by a communications device, an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link; and initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link. According to this solution, the communications device may initiate, based on the obtained identifier of the service flow of the terminal, the obtained first quality of service monitoring parameter, the obtained first flow splitting link correlation information, the obtained second quality of service monitoring parameter, and the obtained second flow splitting link correlation information, the establishment of the first quality of service monitoring connection corresponding to the first flow splitting link and the second quality of service monitoring connection corresponding to the second flow splitting link. Therefore, in a multi-access scenario, in other words, in a scenario in which there are a plurality of available links for one service, quality of service of a multi-access link may be monitored, to provide a policy basis for service switching on different flow splitting links.

Optionally, the communications device includes a session management network element, a user plane function network element, or the terminal.

In a possible design, the communications device is the session management network element; correspondingly, the obtaining, by a communications device, an identifier of a service flow of a terminal includes: receiving, by the session management network element, a first message from a policy control network element, where the first message carries the identifier of the service flow and a flow splitting policy corresponding to the identifier of the service flow, and the flow splitting policy is used to indicate that the service flow is allowed to be split on the first flow splitting link and the second flow splitting link; and the obtaining, by a communications device, first flow splitting link correlation information of the first flow splitting link, and second flow splitting link correlation information of the second flow splitting link includes: determining, by the session management network element, the first flow splitting link correlation information of the first flow splitting link, and the second flow splitting link correlation information of the second flow splitting link. According to this solution, the session management network element may obtain the identifier of the service flow, the first flow splitting link correlation information, and the second flow splitting link correlation information.

In a possible design, the communications device is the session management network element, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the session management network element, the identifier of the service flow, the first quality of service monitoring parameter, the first flow splitting link correlation information, the second quality of service monitoring parameter, and the second flow splitting link correlation information to a user plane function network element. Therefore, the user plane function network element may correlate the identifier of the service flow, the first quality of service monitoring parameter, and the first flow splitting link correlation information; and correlate the identifier of the service flow, the second quality of service monitoring parameter, and the second flow splitting link correlation information, so that the first quality of service monitoring connection and the second quality of service monitoring connection can be established.

In a possible design, the communications device is the session management network element, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the session management network element, the identifier of the service flow, the first quality of service monitoring parameter, the first flow splitting link correlation information, the second quality of service monitoring parameter, and the second flow splitting link correlation information to the terminal by using a first access device corresponding to the first flow splitting link or a second access device corresponding to the second flow splitting link, where the identifier of the service flow, the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link. Therefore, the terminal may correlate the identifier of the service flow, the first quality of service monitoring parameter, and the first flow splitting link correlation information; and correlate the identifier of the service flow the second quality of service monitoring parameter, and the second flow splitting link correlation information, so that the first quality of service monitoring connection and the second quality of service monitoring connection can be established.

In a possible design, the communications device is the session management network element, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the session management network element, the identifier of the service flow and the first quality of service monitoring parameter to the terminal based on the first flow splitting link correlation information by using a first access device corresponding to the first flow splitting link, where the identifier of the service flow and the first quality of service monitoring parameter are used to monitor quality of service of the first flow splitting link; and sending, by the session management network element, the identifier of the service flow and the second quality of service monitoring parameter to the terminal based on the second flow splitting link correlation information by using a second access device corresponding to the second flow splitting link, where the identifier of the service flow and the second quality of service monitoring parameter are used to monitor quality of service of the second flow splitting link. Therefore, the terminal may correlate the identifier of the service flow, the first quality of service monitoring parameter, and the corresponding flow splitting link correlation information; and correlate the identifier of the service flow, the second quality of service monitoring parameter, and the corresponding flow splitting link correlation information, so that the first quality of service monitoring connection and the second quality of service monitoring connection can be established.

In a possible design, the communications device includes the terminal or the user plane function network element; correspondingly, the obtaining, by a communications device, an identifier of a service flow of a terminal includes: receiving, by the terminal or the user plane function network element, a second message from a session management network element, where the second message carries the identifier of the service flow and a flow splitting policy corresponding to the identifier of the service flow, and the flow splitting policy is used to indicate that the service flow is allowed to be split on the first flow splitting link and the second flow splitting link; and the obtaining, by a communications device, first flow splitting link correlation information of the first flow splitting link, and second flow splitting link correlation information of the second flow splitting link includes: determining, by the terminal or the user plane function network element, the first flow splitting link correlation information of the first flow splitting link, and the second flow splitting link correlation information of the second flow splitting link. According to this solution, the terminal or the user plane function network element may obtain the identifier of the service flow; the first flow splitting link correlation information, and the second flow splitting link correlation information.

In a possible design, the communications device is the user plane function network element, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the user plane function network element, the identifier of the service flow, the first quality of service monitoring parameter, the first flow splitting link correlation information, the second quality of service monitoring parameter, and the second flow splitting link correlation information to the terminal by using a first access device corresponding to the first flow splitting link or a second access device corresponding to the second flow splitting link, where the identifier of the service flow, the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link. Therefore, the terminal may correlate the identifier of the service flow, the first quality of service monitoring parameter, and the first flow splitting link correlation information; and correlate the identifier of the service flow; the second quality of service monitoring parameter, and the second flow splitting link correlation information, so that the first quality of service monitoring connection and the second quality of service monitoring connection can be established.

In a possible design, the communications device is the user plane function network element, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the user plane function network element, the identifier of the service flow and the first quality of service monitoring parameter to the terminal based on the first flow splitting link correlation information by using a first access device corresponding to the first flow splitting link, where the identifier of the service flow and the first quality of service monitoring parameter are used to monitor quality of service of the first flow splitting link; and sending, by the user plane function network element, the identifier of the service flow and the second quality of service monitoring parameter to the terminal based on the second flow splitting link correlation information by using a second access device corresponding to the second flow splitting link, where the identifier of the service flow and the second quality of service monitoring parameter are used to monitor quality of service of the second flow splitting link. Therefore, the terminal may correlate the identifier of the service flow, the first quality of service monitoring parameter, and the corresponding flow splitting link correlation information; and correlate the identifier of the service flow, the second quality of service monitoring parameter, and the corresponding flow splitting link correlation information, so that the first quality of service monitoring connection and the second quality of service monitoring connection can be established.

In a possible design, the communications device is the terminal, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the terminal, the identifier of the service flow, the first quality of service monitoring parameter, the first flow splitting link correlation information, the second quality of service monitoring parameter, and the second flow splitting link correlation information to a user plane function network element by using a first access device corresponding to the first flow splitting link or a second access device corresponding to the second flow splitting link, where the identifier of the service flow the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link. Therefore, the user plane function network element may correlate the identifier of the service flow, the first quality of service monitoring parameter, and the first flow splitting link correlation information; and correlate the identifier of the service flow, the second quality of service monitoring parameter, and the second flow splitting link correlation information, so that the first quality of service monitoring connection and the second quality of service monitoring connection can be established.

In a possible design, the communications device is the terminal, and the initiating, by the communications device based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link includes: sending, by the terminal, the identifier of the service flow and the first quality of service monitoring parameter to a user plane function network element based on the first flow splitting link correlation information by using a first access device corresponding to the first flow splitting link, where the identifier of the service flow and the first quality of service monitoring parameter are used to monitor quality of service of the first flow splitting link; and sending, by the terminal, the identifier of the service flow and the second quality of service monitoring parameter to the user plane function network element based on the second flow splitting link correlation information by using a second access device corresponding to the second flow splitting link, where the identifier of the service flow and the second quality of service monitoring parameter are used to monitor quality of service of the second flow splitting link. Therefore, the user plane function network element may correlate the identifier of the service flow, the first quality of service monitoring parameter, and the corresponding flow splitting link correlation information; and correlate the identifier of the service flow, the second quality of service monitoring parameter, and the corresponding flow splitting link correlation information, so that the first quality of service monitoring connection and the second quality of service monitoring connection can be established.

According to a second aspect, a quality of service monitoring method is provided. The method includes: obtaining, by a first packet processing device, an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link; correlating, by the first packet processing device, the identifier of the service flow, the first quality of service monitoring parameter, and the first flow splitting link correlation information; and correlating, by the first packet processing device, the identifier of the service flow, the second quality of service monitoring parameter, and the second flow splitting link correlation information. In other words, in this solution, a first quality of service monitoring connection corresponding to the first flow splitting link and a second quality of service monitoring connection corresponding to the second flow splitting link may be established. Therefore, in a multi-access scenario, in other words, in a scenario in which there are a plurality of available links for one service, quality of service of a multi-access link may be monitored, to provide a policy basis for service switching on different flow splitting links.

Optionally, the first packet processing device includes the terminal or a user plane function network element.

In a possible design, the obtaining, by a first packet processing device, an identifier of a service flow; a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link includes: receiving, by the first packet processing device, the identifier of the service flow; the first quality of service monitoring parameter, the first flow splitting link correlation information, the second quality of service monitoring parameter, and the second flow splitting link correlation information from a session management network element. According to this solution, the first packet processing device may obtain the identifier of the service flow, the first quality of service monitoring parameter, the first flow splitting link correlation information, the second quality of service monitoring parameter, and the second flow splitting link correlation information.

In a possible design, the obtaining, by a first packet processing device, an identifier of a service flow, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link includes: receiving, by the first packet processing device, the identifier of the service flow, the first quality of service monitoring parameter, the first flow splitting link correlation information, the second quality of service monitoring parameter, and the second flow splitting link correlation information from a second packet processing device by using a first access device corresponding to the first flow splitting link or a second access device corresponding to the second flow splitting link. According to this solution, the first packet processing device may obtain the identifier of the service flow, the first quality of service monitoring parameter, the first flow splitting link correlation information, the second quality of service monitoring parameter, and the second flow splitting link correlation information.

In a possible design, the obtaining, by a first packet processing device, an identifier of a service flow, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link includes: receiving, by the first packet processing device, the identifier of the service flow and the first quality of service monitoring parameter from a second packet processing device by using a first access device corresponding to the first flow splitting link, and determining the first flow splitting link correlation information based on information about the first access device; and receiving, by the first packet processing device, the identifier of the service flow and the second quality of service monitoring parameter from the second packet processing device by using a second access device corresponding to the second flow splitting link, and determining the second flow splitting link correlation information based on information about the second access device. According to this solution, the first packet processing device may obtain the identifier of the service flow, the first quality of service monitoring parameter, the first flow splitting link correlation information, the second quality of service monitoring parameter, and the second flow splitting link correlation information.

In a possible design, the correlating, by the first packet processing device, the identifier of the service flow, the first quality of service monitoring parameter, and the first flow splitting link correlation information includes: storing, by the first packet processing device, a correspondence among the identifier of the service flow, the first quality of service monitoring parameter, and the first flow splitting link correlation information; and the correlating, by the first packet processing device, the identifier of the service flow, the second quality of service monitoring parameter, and the second flow splitting link correlation information includes: storing, by the first packet processing device, a correspondence among the identifier of the service flow, the second quality of service monitoring parameter, and the second flow splitting link correlation information. According to this solution, the first quality of service monitoring connection corresponding to the first flow splitting link and the second quality of service monitoring connection corresponding to the second flow splitting link may be established.

In a possible design, the quality of service monitoring method provided in this embodiment of this application further includes: monitoring, by the first packet processing device, quality of service of the first flow splitting link based on the identifier of the service flow, the first quality of service monitoring parameter, and the first flow splitting link correlation information; or monitoring, by the first packet processing device, quality of service of the second flow splitting link based on the identifier of the service flow, the second quality of service monitoring parameter, and the second flow splitting link correlation information. According to this solution, quality of service of a multi-access link may be monitored, to provide a policy basis for service switching on different flow splitting links.

With reference to the first aspect or the second aspect, in a possible design, the first flow splitting link correlation information is information used to identify that the first quality of service monitoring parameter is used to monitor the quality of service of the first flow splitting link, and the second flow splitting link correlation information is information used to identify that the second quality of service monitoring parameter is used to monitor the quality of service of the second flow splitting link.

With reference to the first aspect or the second aspect, in a possible design, the first flow splitting link correlation information includes at least one of a first access type corresponding to the first flow splitting link, a first session identifier corresponding to the first flow splitting link, a first tunnel identifier corresponding to the first flow splitting link, or a first monitoring identifier corresponding to the first flow splitting link; and the second flow splitting link correlation information includes at least one of a second access type corresponding to the second flow splitting link, a second session identifier corresponding to the second flow splitting link, a second tunnel identifier corresponding to the second flow splitting link, or a second monitoring identifier corresponding to the second flow splitting link.

According to a third aspect, a communications device is provided, and the communications device has functions of implementing the method according to the first aspect. The functions may be implemented by hardware, or may be implemented by hardware executing corresponding software. The hardware or the software includes one or more modules corresponding to the functions.

According to a fourth aspect, a communications device is provided, and includes a processor and a memory. The memory is configured to store a computer-executable instruction, and when the communications device runs, the processor executes the computer-executable instruction stored in the memory, so that the communications device performs the quality of service monitoring method according to the first aspect.

According to a fifth aspect, a communications device is provided, and includes a processor. The processor is configured to: after being coupled to a memory and reading an instruction in the memory, perform, according to the instruction, the quality of service monitoring method according to the first aspect.

According to a sixth aspect, a computer readable storage medium is provided. The computer readable storage medium stores an instruction, and when the instruction is run on a computer, the computer is enabled to perform the quality of service monitoring method according to the first aspect.

According to a seventh aspect, a computer program product including an instruction is provided. When the computer program product is run on a computer, the computer is enabled to perform the quality of service monitoring method according to the first aspect.

According to an eighth aspect, a chip system is provided. The chip system includes a processor, configured to support a communications device in implementing the functions in the first aspect, for example, obtaining an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. In a possible design, the chip system further includes a memory. The memory is configured to store a program instruction and data that are necessary for the communications device. The chip system may include a chip, or may include a chip and another discrete device.

For technical effects brought by any one of the design manners of the third aspect to the eighth aspect, refer to technical effects brought by different design manners of the first aspect, and details are not described herein again.

According to a ninth aspect, a first packet processing device is provided, and the first packet processing device has functions of implementing the method according to the second aspect. The functions may be implemented by hardware, or may be implemented by hardware executing corresponding software. The hardware or the software includes one or more modules corresponding to the functions.

According to a tenth aspect, a first packet processing device is provided, and includes a processor and a memory. The memory is configured to store a computer-executable instruction, and when the first packet processing device runs, the processor executes the computer-executable instruction stored in the memory, so that the first packet processing device performs the quality of service monitoring method according to the second aspect.

According to an eleventh aspect, a first packet processing device is provided, and includes a processor. The processor is configured to: after being coupled to a memory and reading an instruction in the memory, perform, according to the instruction, the quality of service monitoring method according to the first aspect.

According to a twelfth aspect, a computer readable storage medium is provided. The computer readable storage medium stores an instruction, and when the instruction is run on a computer, the computer is enabled to perform the quality of service monitoring method according to the second aspect.

According to a thirteenth aspect, a computer program product including an instruction is provided. When the computer program product is run on a computer, the computer is enabled to perform the quality of service monitoring method according to the second aspect.

According to a fourteenth aspect, a chip system is provided. The chip system includes a processor, configured to support a first packet processing device in implementing the functions in the second aspect, for example, correlating an identifier of a service flow, a first quality of service monitoring parameter, and first flow splitting link correlation information; and correlating the identifier of the service flow, a second quality of service monitoring parameter, and second flow splitting link correlation information. In a possible design, the chip system further includes a memory. The memory is configured to store a program instruction and data that are necessary for the first packet processing device. The chip system may include a chip, or may include a chip and another discrete device.

For technical effects brought by any one of the design manners of the ninth aspect to the fourteenth aspect, refer to technical effects brought by different design manners of the second aspect, and details are not described herein again.

According to a fifteenth aspect, a quality of service monitoring system is provided, and the quality of service monitoring system includes a session management network element and a user plane function network element. The session management network element is configured to obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. The session management network element is further configured to send the identifier of the service flow, the first quality of service monitoring parameter, the first flown splitting link correlation information, the second quality of service monitoring parameter, and the second flow splitting link correlation information to the user plane function network element. The user plane function network element is configured to receive the identifier of the service flow, the first quality of service monitoring parameter, the first flow splitting link correlation information, the second quality of service monitoring parameter, and the second flow splitting link correlation information from the session management network element. The user plane function network element is configured to: correlate the identifier of the service flow, the first quality of service monitoring parameter, and the first flow splitting link correlation information; and correlate the identifier of the service flow, the second quality of service monitoring parameter, and the second flow splitting link correlation information.

In a possible design, the quality of service monitoring system further includes a policy control network element. The policy control network element is configured to send a first message to the session management network element, where the first message carries the identifier of the service flow and a flow splitting policy corresponding to the identifier of the service flow, and the flow splitting policy is used to indicate that the service flow is allowed to be split on the first flow splitting link and the second flow splitting link. Correspondingly, that the session management network element is configured to obtain an identifier of a service flow of a terminal includes: receiving the first message from the policy control network element; and that the session management network element is configured to obtain the first flow splitting link correlation information and the second flow splitting link correlation information includes: determining the first flow splitting link correlation information and the second flow splitting link correlation information.

According to a sixteenth aspect, a quality of service monitoring system is provided, and the quality of service monitoring system includes a first packet processing device and a second packet processing device. The second packet processing device is configured to obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. The second packet processing device is further configured to send the identifier of the service flow, the first quality of service monitoring parameter, the first flow splitting link correlation information, the second quality of service monitoring parameter, and the second flow splitting link correlation information to the first packet processing device by using a first access device corresponding to the first flow splitting link or a second access device corresponding to the second flow splitting link. The first packet processing device is configured to receive, by using the first access device or the second access device, the identifier of the service flow, the first quality of service monitoring parameter, the first flow splitting link correlation information, the second quality of service monitoring parameter, and the second flow splitting link correlation information that are sent by the second packet processing device. The first packet processing device is further configured to: correlate the identifier of the service flow, the first quality of service monitoring parameter, and the first flow splitting link correlation information; and correlate the identifier of the service flow, the second quality of service monitoring parameter, and the second flow splitting link correlation information.

According to a seventeenth aspect, a quality of service monitoring system is provided, and the quality of service monitoring system includes a first packet processing device and a second packet processing device. The second packet processing device is configured to obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. The second packet processing device is further configured to send the identifier of the service flow and the first quality of service monitoring parameter to the first packet processing device based on the first flow splitting link correlation information by using a first access device corresponding to the flow splitting link. The second packet processing device is further configured to send the identifier of the service flow and the second quality of service monitoring parameter to the first packet processing device based on the second flow splitting link correlation information by using a second access device corresponding to the second flow splitting link. The first packet processing device is configured to: receive the identifier of the service flow and the first quality of service monitoring parameter from the second packet processing device by using the first access device; and after determining third flow splitting link correlation information of the first flow splitting link based on information about the first access device, correlate the identifier of the service flow; the first quality of service monitoring parameter, and the third flow splitting link correlation information. The first packet processing device is further configured to: receive the identifier of the service flow and the second quality of service monitoring parameter from the second packet processing device by using the second access device; and after determining fourth flow splitting link correlation information of the second flow splitting link based on information about the second access device, correlate the identifier of the service flow, the second quality of service monitoring parameter, and the fourth flow splitting link correlation information.

With reference to the sixteenth aspect or the seventeenth aspect, in a possible design, the quality of service monitoring system further includes a session management network element. The session management network element is configured to send a first message to the second packet processing device, where the first message carries the identifier of the service flow and a flow splitting policy corresponding to the identifier of the service flow, and the flow splitting policy is used to indicate that the service flow is allowed to be split on the first flow splitting link and the second flow splitting link. Correspondingly, that the second packet processing device is configured to obtain an identifier of a service flow of a terminal includes: receiving the first message from the session management network element; and that the second packet processing device is configured to obtain the first flow splitting link correlation information and the second flow splitting link correlation information includes: determining the first flow splitting link correlation information and the second flow splitting link correlation information.

With reference to the sixteenth aspect or the seventeenth aspect, in a possible design, the first packet processing device is the terminal, and the second packet processing device is a user plane function network element; or the first packet processing device is a user plane function network element, and the second packet processing device is the terminal.

For technical effects brought by any one of the design manners of the fifteenth aspect to the seventeenth aspect, refer to technical effects brought by different design manners of the first aspect or the second aspect, and details are not described herein again.

DESCRIPTION OF EMBODIMENTS

For ease of understanding technical solutions in the embodiments of this application, the following first briefly describes technologies related to this application.

Figure 1:
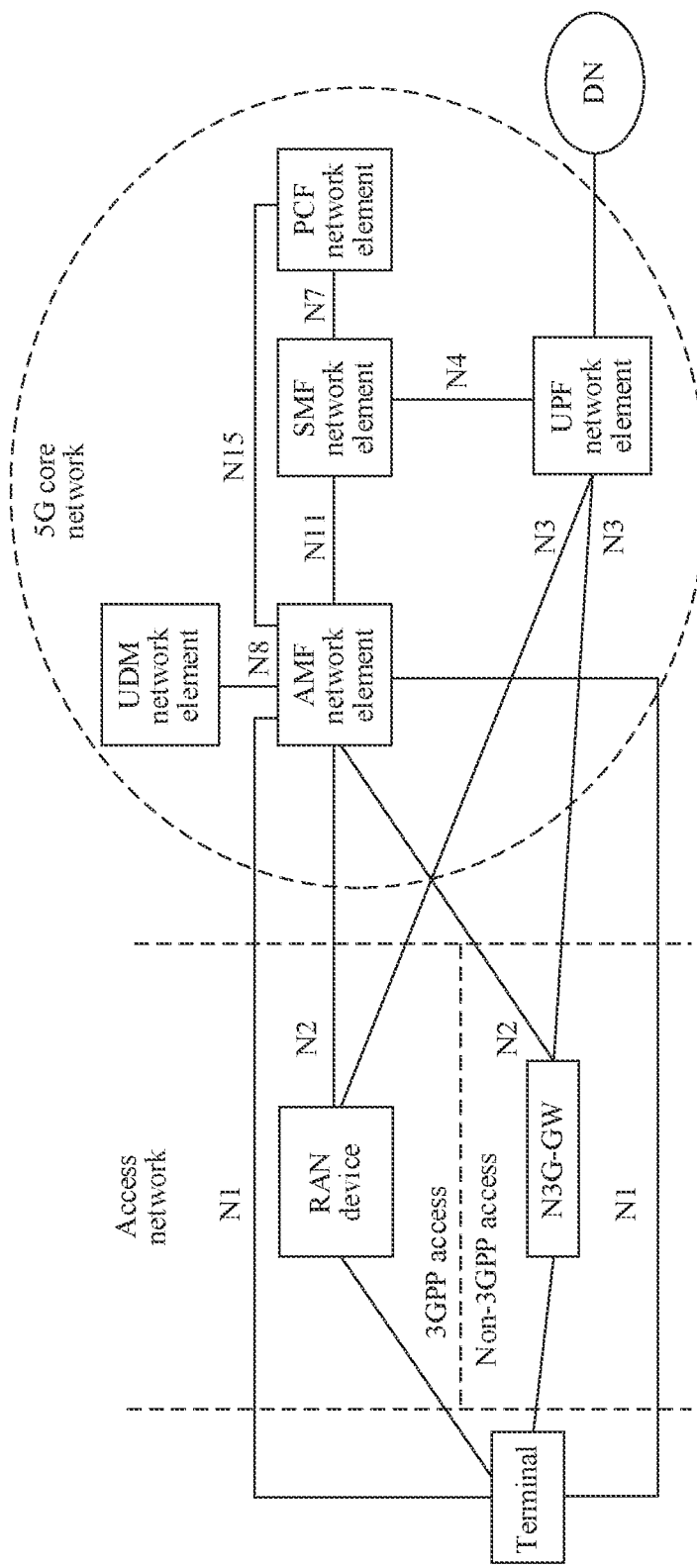
FIG. 1 is a schematic diagram of a multi-access 5G network architecture according to an embodiment of this application.

Multi-Access 5G Network Architecture:

FIG. 1 shows a 5G network architecture according to an embodiment of this application. The architecture not only supports a terminal in accessing a 5G core network by using a 3GPP access technology, but also supports the terminal in accessing the 5G core network by using a non-3GPP access technology.

As shown in FIG. 1, when the terminal is to access the 5G core network by using the 3GPP access technology, the terminal accesses the 5G core network by using a radio access network (RAN) device; and when the terminal is to access the 5G core network by using the non-3GPP access technology, the terminal accesses the 5G core network by using a non-3GPP access gateway (N3G-GW). The 5G core network may include an access and mobility management function (AMF) network element, a user plane function (UPF) network element, a session management function (SMF) network element, a unified data management (UDM) network element, and the like. The RAN device or the N3G-GW may access a data network (DN) by using the UPF network element.

The terminal communicates with the AMF network element through a next generation (N) network interface 1 (N1 for short). The RAN device or the N3G-GW communicates with the AMF network element through an N2 interface (N2 for short). The RAN device or the N3G-GW communicates with the UPF network element through an N3 interface (N3 for short). The AMF network element communicates with the UDM network element through an N8 interface (N8 for short). The AMF network element communicates with the SMF network element through an N11 interface (N11 for short). The SMF network element communicates with the UPF network element through an N4 interface (N4 for short).

It should be noted that names of the interfaces between the network elements in FIG. 1 are only examples, and the interfaces may have other names during specific implementation. This is not specifically limited in the embodiments of this application.

Optionally, the RAN device in this embodiment of this application is a device accessing the 5G core network by using the 3GPP access technology. For example, the RAN device may be a base station, a broadband network gateway (BNG), or an aggregation switch. This is not specifically limited in the embodiments of this application. The base station may include various types of base stations, for example, a macro base station, a micro base station (also referred to as a small cell), a relay node, and an access point. This is not specifically limited in the embodiments of this application.

Optionally, the N3G-GW in this embodiment of this application is a device accessing the 5G core network by using the non-3GPP access technology. For example, the N3G-GW may be a broadband network gateway (BNG), a broadband remote access server (BRAS), a fixed network access gateway, or a wireless local area network (WLAN) access gateway. This is not specifically limited in the embodiments of this application.

It should be noted that the RAN device, the N3G-GW the SMF network element, the UPF network element, the AMF network element, the UDM network element, and the like in FIG. 1 are merely names, and the names do not constitute any limitation on the devices. In a 5G network and another future network, network elements or entities corresponding to the RAN device, the N3G-GW, the SMF network element, the UPF network element, the AMP network element, and the UDM network element may have other names. This is not specifically limited in the embodiments of this application. For example, the UDM network element may be replaced with a home subscriber server (HSS), a subscriber subscription database (USD), or a database entity; and the N3G-GW may be replaced with a next generation packet data gateway (NG-PDG), a non-3GPP interworking function (N3IWF) network element, an entrusted non-3GPP access gateway, a trusted non-3GPP access gateway, or a fixed network access gateway function (AGF). This is generally described herein. Details are not described below again.

In addition, although not shown, the 5G core network may further include an authentication server function (AUSF) network element, a policy control function (PCF) network element, or the like. This is not specifically limited in the embodiments of this application.

Optionally, the 5G core network in this embodiment of this application may be a visited public land mobile network (VPLMN) in a terminal roaming scenario, or may be a home public land mobile network (HPLMN) in a terminal non-roaming scenario. This is not specifically limited in the embodiments of this application.

Service Flow:

The service flow in the embodiments of this application includes a service aggregation flow and a service subflow. For example, in a 5G network shown in FIG. 1, the service aggregation flow includes a packet data unit (PDU) session or a specific quality of service (QoS) flow in the PDU session, and the service subflow includes a specific service flow in a QoS flow.

Figure 2:
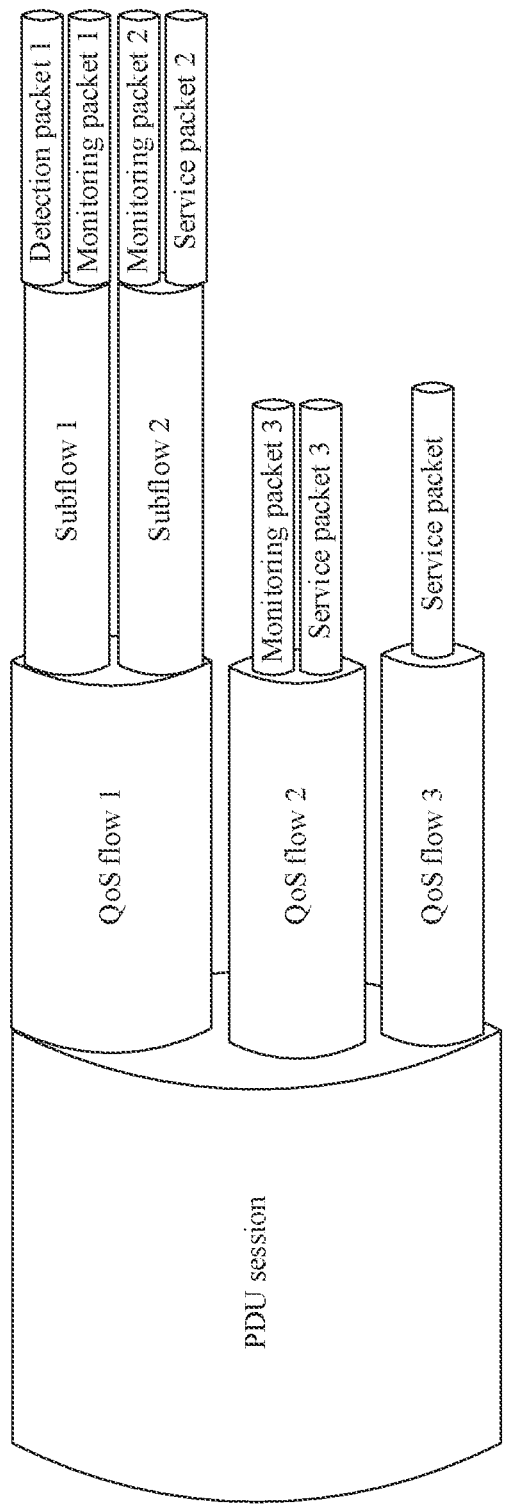
FIG. 2 is a schematic diagram of service flow distribution in a 5G network according to an embodiment of this application.

For example, as shown in FIG. 2, it is assumed that one PDU session includes three QoS flows: a QoS flow 1, a QoS flow 2, and a QoS flow 3. The QoS flow 1 includes a subflow 1 and a subflow 2. The subflow 1 and the subflow 2 correspond to different service flows. For example, the subflow 1 corresponds to a vehicle-to-everything communication (V2X) service flow 1, and the subflow 2 corresponds to a V2X service flow 2. In this case, in FIG. 2, the service aggregation flow includes the PDU session, the QoS flow 1, the QoS flow 2, and the QoS flow 3; and the service subflow includes the subflow 1 and the subflow 2. The service subflow or the service aggregation flow may be used to transmit a service packet and a monitoring packet. The service packet is specifically a user packet, in other words, a packet that is transmitted by a terminal or an application server through a network to execute a specific service. The monitoring packet is specifically a packet that is in the network and that is used to monitor quality of service. The monitoring packet is generated by a packet sending device or a packet transceiver device. The packet sending device or the packet transceiver device may be a terminal or a user plane function (UPF) network element in the 5G network; or may be another network element in the future network. This is not specifically limited in the embodiments of this application.

Service Flow Identifier:

In the embodiments of this application, different types of service flows correspond to different service flow identifiers.

For example, assuming that a service flow is a PDU session, a corresponding service flow identifier may be, for example, an address of a terminal, such as an interact protocol (IP) address or a media access control (MAC) address of the terminal.

Assuming that the service flow is a specific QoS flow in the PDU session, the corresponding service flow identifier may be, for example, a quality of service flow identifier (QFI).

Assuming that the service flow is a specific service flow a QoS flow, the corresponding service flow identifier may be, for example, a 5-tuple. The 5-tuple in the embodiments of this application may include, for example, a source IP address, a destination IP address, a source port number, a destination port number, and a transport layer protocol number. This is generally described herein, and details are not described below again.

Quality of Service Monitoring Parameter:

The quality of service monitoring parameter in the embodiments of this application is used to monitor quality of service of a flow splitting link.

For example, the quality of service monitoring parameter may include a monitoring packet sending period a QoS parameter that needs to be monitored, a reporting threshold a monitoring packet sending moment, or a monitoring packet sending sequence number. This is not specifically limited in the embodiments of this application.

For specific descriptions of the quality of service monitoring parameter, refer to an existing solution, and details are not described herein.

The following describes the technical solutions in the embodiments of this application with reference to the accompanying drawings in the embodiments of this application. In descriptions of this application, "/" means "or" unless otherwise specified. For example, A/B may represent A or B. In this specification, "and/or" describes only an correlation relationship for describing associated objects and represents that three relationships may exist. For example, A and/or B may represent the following three cases: Only A exists, both A and B exist, and only B exists. In addition, in the descriptions of this application, unless otherwise specified, "a plurality of" means two or more, and "at least one" means one or more. In addition, to clearly describe the technical solutions in the embodiments of this application, terms such as "first" and "second" are used in the embodiments of this application to distinguish between same items or similar items that have basically same functions or purposes. A person skilled in the art may understand that the terms such as "first" and "second" do not limit a quantity or an execution sequence, and that the terms such as "first" and "second" do not indicate a definite difference.

In addition, network architectures and service scenarios described in the embodiments of this application are intended to more clearly describe the technical solutions in the embodiments of this application, but do not limit the technical solutions provided in the embodiments of this application. A person of ordinary skill in the art may learn that, as the network architectures evolve and a new service scenario emerges, the technical solutions provided in the embodiments of this application are also applicable to a similar technical problem.

Figure 3:
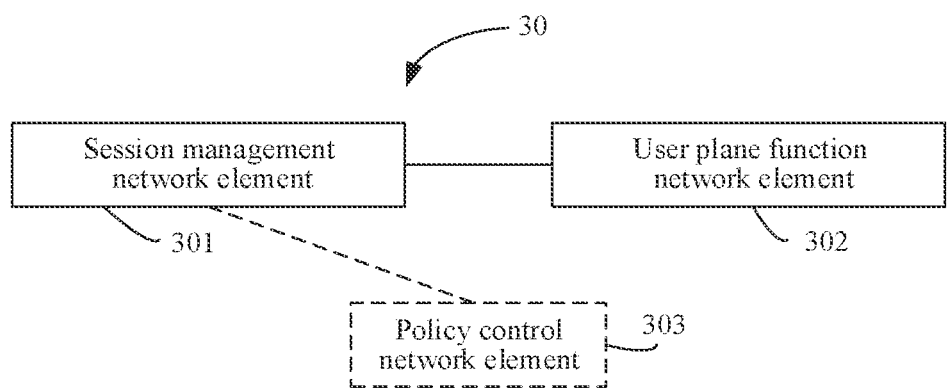
FIG. 3 is a first schematic structural diagram of a quality of service monitoring system according to an embodiment of this application.

FIG. 3 shows a quality of service monitoring system 30 according to an embodiment of this application. The quality of service monitoring system 30 includes a session management network element 301 and a user plane function network element 302.

The session management network element 301 is configured to: obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link; and send the identifier of the service flow, the first quality of service monitoring parameter, the first flow splitting link correlation information, the second quality of service monitoring parameter, and the second flow splitting link correlation information to the user plane function network element 302.

The user plane function network element 302 is configured to: receive the identifier of the service flow, the first quality of service monitoring parameter, the first flow splitting link correlation information, the second quality of service monitoring parameter, and the second flow splitting link correlation information from the session management network element 301; correlate the identifier of the service flow, the first quality of service monitoring parameter, and the first flow splitting link correlation information; and correlate the identifier of the service flow, the second quality of service monitoring parameter, and the second flow splitting link correlation information.

For related descriptions of the service flow or the identifier of the service flow, refer to some brief descriptions of the service flow or the identifier of the service flow, and details are not described herein again.

For related descriptions of the first quality of service monitoring parameter and the second quality of service monitoring parameter, refer to some brief descriptions of the foregoing quality of service monitoring parameters, and details are not described herein again.

Optionally, in this embodiment of this application, the first flow splitting link correlation information is information used to identify that the first quality of service monitoring parameter is used to monitor quality of service of the first flow splitting link, and the second flow splitting link correlation information is information used to identify that the second quality of service monitoring parameter is used to monitor quality of service of the second flow splitting link. This is generally described herein, and details are not described below again.

For example, the first flow splitting link correlation information may include at least one of a first access type corresponding to the first flow splitting link, a first session identifier corresponding to the first flow splitting link, a first tunnel identifier corresponding to the first flow splitting link, or a first monitoring identifier corresponding to the first flow splitting link; and the second flow splitting link correlation information may include at least one of a second access type corresponding to the second flow splitting link, a second session identifier corresponding to the second flow splitting link, a second tunnel identifier corresponding to the second flow splitting link, or a second monitoring identifier corresponding to the second flow splitting link.

In this embodiment of this application, the first access type corresponding to the first flow splitting link may be, for example, an access type corresponding to a 3GPP access technology, and the second access type corresponding to the second flow splitting link may be, for example, an access type corresponding to a non-3GPP access technology, or both the first access type corresponding to the first flow splitting link and the second access type corresponding to the second flow splitting link may be, for example, an access type corresponding to a 3GPP access technology; or both the first access type corresponding to the first flow splitting link and the second access type corresponding to the second flow splitting link may be, for example, an access type corresponding to a non-3GPP access technology, or the like. This is not specifically limited in this embodiment of this application.

For example, the access type corresponding to the 3GPP access technology may be a cellular network type, and the access type corresponding to the non-3GPP access technology may be a fixed network type or a WLAN type. This is not specifically limited in this embodiment of this application.

In this embodiment of this application, the first session identifier corresponding to the first flow splitting link may be, for example, a PDU session identifier (ID) of a first session corresponding to the first flow splitting link, and the second session identifier corresponding to the second flow splitting link may be, for example, a PDU session ID of a second session corresponding to the second flow splitting link. This is not specifically limited in this embodiment of this application.

In this embodiment of this application, the first tunnel identifier corresponding to the first flow splitting link may include, for example, a tunnel endpoint identifier (TEID) of the user plane function network element and a TEID of a corresponding first access device; or the first tunnel identifier corresponding to the first flow splitting link may include, for example, a first generic routing encapsulation (GRE) key or a first QFI. This is not specifically limited in this embodiment of this application.

In this embodiment of this application, the second tunnel identifier corresponding to the second flow splitting link may include, for example, a TEID of the user plane function network element and a TEID of a corresponding second access device; or the second tunnel identifier corresponding to the second flow splitting link may include, for example, a second GRE key or a second QFI. This is not specifically limited in this embodiment of this application.

In this embodiment of this application, the first monitoring identifier corresponding to the first flow splitting link may be specifically an identifier of a monitoring packet on the first flow splitting link, and the second monitoring identifier corresponding to the second flow splitting link may be specifically an identifier of a monitoring packet on the second flow splitting link. This is not specifically limited in this embodiment of this application.

For example, the first monitoring identifier or the second monitoring identifier may be a link quality awareness protocol (LQAP) ID.

Optionally, in this embodiment of this application, the session management network element 301 and the user plane function network element 302 may directly communicate with each other, or may communicate with each other through forwarding by another device. This is not specifically limited in this embodiment of this application.

According to the quality of service monitoring system provided in this embodiment of this application, the user plane function network element may obtain the identifier of the service flow of the terminal, the first quality of service monitoring parameter, the first flow splitting link correlation information, the second quality of service monitoring parameter, and the second flow splitting link correlation information; correlate the identifier of the service flow, the first quality of service monitoring parameter, and the first flow splitting link correlation information; and correlate the identifier of the service flow, the second quality of service monitoring parameter, and the second flow splitting link correlation information. Therefore, in a multi-access scenario, in other words, in a scenario in which there are a plurality of available links for one service, quality of service of a multi-access link may be monitored, to provide a policy basis for service switching on different flow splitting links.

Optionally, as shown in FIG. 3, the quality of service monitoring system 30 provided in this embodiment of this application may further include a policy control network element 303.

The policy control network element 303 is configured to send a first message to the session management network element 301. The first message carries the identifier of the service flow and a flow splitting policy corresponding to the identifier of the service flow, and the flow splitting policy is used to indicate that the service flow is allowed to be split on the first flow splitting link and the second flow splitting link.

Correspondingly, that the session management network element 301 is configured to obtain an identifier of a service flow of a terminal includes: receiving the first message from the policy control network element 303.

That the session management network element 301 is configured to obtain first flow splitting link correlation information and second flow splitting link correlation information includes: determining the first flow splitting link correlation information and the second flow splitting link correlation information.

For example, the flow splitting policy in this embodiment of this application may include: the service flow may be transmitted on the first flow splitting link and the second flow splitting link. Optionally, the flow splitting policy may further include, for example, 80% of the service flow is transmitted on the first flow splitting link, and 20% of the service flow is transmitted on the second flow splitting link. Optionally, the flow splitting policy may further include, for example, the service flow may be dynamically split based on load of the first flow splitting link and load of the second flow splitting link.

Alternatively, for example, the flow splitting policy in this embodiment of this application may include: the service flow is preferentially transmitted on the first flow splitting link, and when the quality of service (for example, a delay, a jitter, or a packet loss rate) of the first flow splitting link is less than a preset threshold, the service flow is switched to the second flow splitting link.

In other words, in this embodiment of this application, the session management network element may learn, according to the flow splitting policy sent by the policy control network element, that the service flow is allowed to be split on the first flow splitting link and the second flow splitting link. Then, the session management network element may determine the first flow splitting link correlation information of the first flow splitting link and the second flow splitting link correlation information of the second flow splitting link.

Optionally, in this embodiment of this application, the session management network element 301 and the policy control network element 303 may directly communicate with each other, or may communicate with each other through forwarding by another device. This is not specifically limited in this embodiment of this application.

Figure 4:
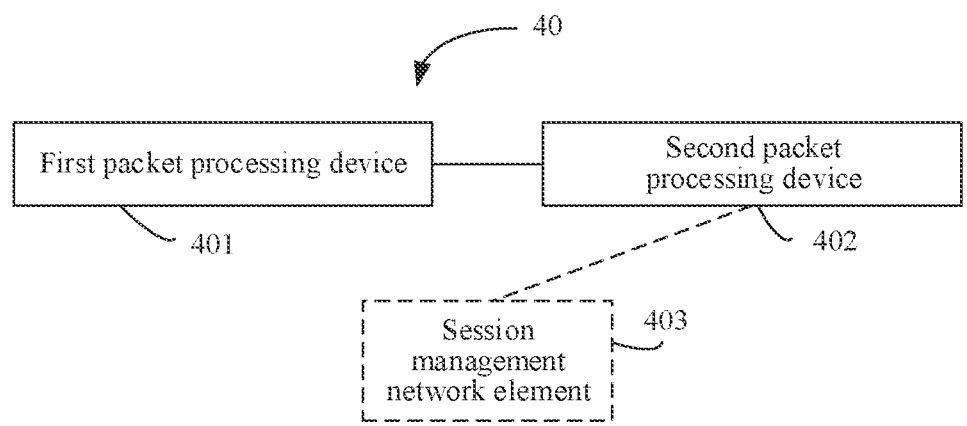
FIG. 4 is a second schematic structural diagram of a quality of service monitoring system according to an embodiment of this application.

FIG. 4 shows another quality of service monitoring system 40 according to an embodiment of this application. The quality of service monitoring system 40 includes a first packet processing device 401 and a second packet processing device 402.

In a possible implementation, the second packet processing device 402 is configured to: obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link; and send the identifier of the service flow, the first quality of service monitoring parameter, the first flow splitting link correlation information, the second quality of service monitoring parameter, and the second flow splitting link correlation information to the first packet processing device 401 by using a first access device corresponding to the first flow splitting link or a second access device corresponding to the second flow splitting link.

The first packet processing device 401 is configured to: receive, by using the first access device or the second access device, the identifier of the service flow; the first quality of service monitoring parameter, the first flow splitting link correlation information, the second quality of service monitoring parameter, and the second flow splitting link correlation information that are sent by the second packet processing device 402; correlate the identifier of the service flow, the first quality of service monitoring parameter, and the first flow splitting link correlation information; and correlate the identifier of the service flow, the second quality of service monitoring parameter, and the second flow splitting link correlation information.

In another possible implementation, the second packet processing device 402 is configured to: obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link; and send the identifier of the service flow and the first quality of service monitoring parameter to the first packet processing device 401 based on the first flow splitting link correlation information by using a first access device corresponding to the first flow splitting link; and send the identifier of the service flow and the second quality of service monitoring parameter to the first packet processing device 401 based on the second flow splitting link correlation information by using a second access device corresponding to the second flow splitting link.

The first packet processing device 401 is configured to: receive the identifier of the service flow and the first quality of service monitoring parameter from the second packet processing device 402 by using the first access device; and after determining third flow splitting link correlation information of the first flow splitting link based on information about the first access device, correlate the identifier of the service flow, the first quality of service monitoring parameter, and the third flow splitting link correlation information.

The first packet processing device 401 is further configured to: receive the identifier of the service flow and the second quality of service monitoring parameter from the second packet processing device 402 by using the second access device; and after determining fourth flow splitting link correlation information of the second flow splitting link based on information about the second access device, correlate the identifier of the service flow, the second quality of service monitoring parameter, and the fourth flow splitting link correlation information.

Optionally, in this embodiment of this application, for related descriptions of the third flow splitting link correlation information, refer to the related descriptions of the first flow splitting link correlation information; and for related descriptions of the fourth flow splitting link correlation information, refer to the related descriptions of the second flow splitting link correlation information. Details are not described herein again.

Optionally, the third flow splitting link correlation information in this embodiment of this application may be the same as or may be different from the first flow splitting link correlation information, and the fourth flow splitting link correlation information in this embodiment of this application may be the same as or may be different from the second flow splitting link correlation information. This is not specifically limited in this embodiment of this application.

In this embodiment of this application, for related descriptions of the service flow, the identifier of the service flow, the first quality of service monitoring parameter, the first flow splitting link correlation information, the second quality of service monitoring parameter, and the second flow splitting link correlation information, refer to the embodiment shown in FIG. 3, and details are not described herein again.

Optionally, in this embodiment of this application, the first packet processing device 401 may be a terminal, and the second packet processing device 402 may be a user plane function network element; or the first packet processing device 401 may be a user plane function network element, and the second packet processing device 402 may be a terminal, or the like. This is not specifically limited in this embodiment of this application.

Optionally, in this embodiment of this application, the first packet processing device 401 and the second packet processing device 402 may directly communicate with each other, or may communicate with each other through forwarding by another device. This is not specifically limited in this embodiment of this application.

According to the quality of service monitoring system provided in this embodiment of this application, in a multi-access scenario, in other words, in a scenario in which there are a plurality of available links for one service, quality of service of a multi-access link may be monitored, to provide a policy basis for service switching on different flow splitting links. For a related technical effect, refer to the embodiment shown in FIG. 3, and details are not described herein again.

Optionally, as shown in FIG. 4, the quality of service monitoring system 40 provided in this embodiment of this application may further include a session management network element 403.

The session management network element 403 is configured to send a first message to the second packet processing device 402. The first message carries the identifier of the service flow and a flow splitting policy corresponding to the identifier of the service flow, and the flow splitting policy is used to indicate that the service flow is allowed to be split on the first flow splitting link and the second flow splitting link.

Correspondingly, that the second packet processing device 402 is configured to obtain an identifier of a service flow of a terminal includes: receiving the first message from the session management network element 403.

That the second packet processing device 402 is configured to obtain first flow splitting link correlation information and second flow splitting link correlation information includes: determining the first flow splitting link correlation information and the second flow splitting link correlation information.

For related descriptions of the flow splitting policy, refer to the embodiment shown in FIG. 3, and details are not described again herein.

In other words, in this embodiment of this application, the second packet processing device 402 may learn, according to the flow splitting policy sent by the session management network element 403, that the service flow is allowed to be split on the first flow splitting link and the second flow splitting link. Then, the second packet processing device 402 may determine the first flow splitting link correlation information of the first flow splitting link and the second flow splitting link correlation information of the second flow splitting link.

Optionally, in this embodiment of this application, the session management network element 403 and the second packet processing device 402 may directly communicate with each other, or may communicate with each other through forwarding by another device. This is not specifically limited in this embodiment of this application.

Optionally, the quality of service monitoring system shown in FIG. 3 or FIG. 4 may be applied to a current 5G network, or may be applied to another future network. This is not specifically limited in embodiments of this application.

If the quality of service monitoring system shown in FIG. 3 or FIG. 4 may be applied to the current 5G network, a network element or an entity corresponding to the session management network element in FIG. 3 or FIG. 4 may be the SMF network element in the 5G network shown in FIG. 1, a network element or an entity corresponding to the user plane function network element in FIG. 3 may be the UPF network element in the 5G network shown in FIG. 1, a network element or an entity corresponding to the policy control network element in FIG. 3 may be the PCF network element in the 5G network shown in FIG. 1, a network element or an entity corresponding to the first packet processing device in FIG. 4 may be the terminal in the 5G network shown in FIG. 1, and a network element or an entity corresponding to the second packet processing device may be the IMF network element in the 5G network shown in FIG. 1; or a network element or an entity corresponding to the first packet processing device in FIG. 4 may be the UPF network element in the 5G network shown in FIG. 1, and a network element or an entity corresponding to the second packet processing device may be the terminal in the 5G network shown in FIG. 1.

Optionally, the terminal in the embodiments of this application may include various handheld devices, vehicle-mounted devices, wearable devices, or computing devices having a wireless communication function, or other processing devices connected to a wireless modem. The terminal may alternatively include a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, user equipment (UE), a mobile station (mobile station, MS), a terminal device, relay user equipment, or the like. The relay user equipment may be, for example, a 5G residential gateway (RG). For ease of description, in this application, the devices mentioned above are collectively referred to as the terminal.

Optionally, the access device in the embodiments of this application is a device that accesses a 5G core network, for example, may be the RAN device or the N3G-GW in FIG. 1. For related descriptions, refer to the part in FIG. 1, and details are not described herein again.

Optionally, in the embodiments of this application, the session management network element or the user plane function network element in FIG. 3, or the first packet processing device or the second packet processing device in FIG. 4 may be implemented as one device, or may be implemented as a plurality of devices, or may be a function module in one device. This is not specifically limited in the embodiments of this application. It can be understood that the foregoing functions may be network elements in a hardware device, or may be software functions running on dedicated hardware, or may be virtualization functions instantiated on a platform (for example, a cloud platform).

Figure 5:
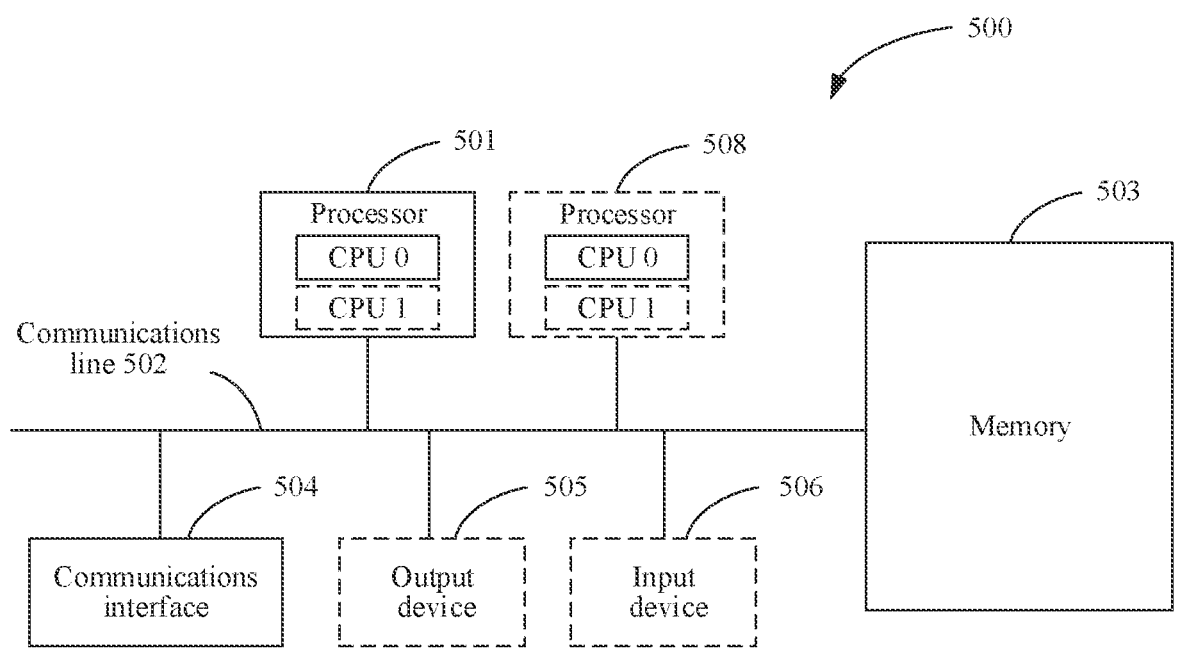
FIG. 5 is a schematic diagram of a hardware structure of a communications device according to an embodiment of this application.

For example, in the embodiments of this application, the session management network element or the user plane function network element in FIG. 3, or the first packet processing device or the second packet processing device in FIG. 4 may be implemented as a communications device in FIG. 5. FIG. 5 is a schematic diagram of a hardware structure of a communications device 500 according to an embodiment of this application. The communications device 500 includes at least one processor 501, a communications line 502, a memory 503, and at least one communications interface 504.

The processor 501 may be a general-purpose central processing unit (CPU), a microprocessor, an application-specific integrated circuit (ASIC), or one or more integrated circuits configured to control program execution of the solutions of this application.

The communications line 502 may include a channel on which information is transmitted between the foregoing components.

The communications interface 504 is an apparatus that uses any transceiver, and is configured to communicate with another device or a communications network, such as the Ethernet, a radio access network (RAN), or a wireless local area network (WLAN).

The memory 503 may be a read-only memory (ROM) or another type of static storage device that can store static information and an instruction, or a random access memory (RAM) or another type of dynamic storage device that can store information and an instruction; or may be an electrically erasable programmable read-only memory (EEPROM), a compact disc read-only memory (CD-ROM) or another compact disc storage, an optical disc storage (including a compact optical disc, a laser disc, an optical disc, a digital versatile optical disc, a blue optical disc, and the like), a magnetic disk storage medium or another magnetic storage device, or any other medium that can carry or store expected program code in an instruction structure form or a data structure form and that can be accessed by a computer. However, this is not limited thereto. The memory 503 may exist independently, and is connected to the processor 501 by using the communications line 502. Alternatively, the memory 503 may be integrated with the processor 501.

The memory 503 is configured to store a computer-executable instruction for executing the solutions of this application, and the processor 501 controls the execution of the computer-executable instruction. The processor 501 is configured to execute the computer-executable instruction stored in the memory 503, to implement a quality of service monitoring method provided in the following embodiments of this application.

Optionally, the computer-executable instruction in this embodiment of this application may also be referred to as application program code. This is not specifically limited in this embodiment of this application.

During specific implementation, in an embodiment, the processor 501 may include one or more CPUs, for example, a CPU 0 and a CPU 1 in FIG. 5.

During specific implementation, in an embodiment, the communications device 500 may include a plurality of processors, for example, the processor 501 and a processor 508 in FIG. 5. Each of these processors may be a single-core (single-CPU) processor, or may be a multi-core (multi-CPU) processor. The processor herein may be one or more devices, circuits, and/or processing cores configured to process data (for example, a computer program instruction).

During specific implementation, in an embodiment, the communications device 500 may further include an output device 505 and an input device 506. The output device 505 communicates with the processor 501, and may display information in a plurality of manners. For example, the output device 505 may be a liquid crystal display (LCD), a light emitting diode (LED) display device, a cathode ray tube (CRT) display device, or a projector. The input device 506 communicates with the processor 501, and may receive an input of a user in a plurality of manners. For example, the input device 506 may be a mouse, a keyboard, a touchscreen device, or a sensor device.

The communications device 500 may be a general-purpose device or a dedicated device. During specific implementation, the communications device 500 may be a desktop computer, a portable computer, a network server, a palmtop computer (personal digital assistant, PDA), a mobile phone, a tablet computer, a wireless terminal device, an embedded device, or a device with a structure similar to that in FIG. 5. A type of the communications device 500 is not limited in this embodiment of this application.

The following describes in detail the quality of service monitoring method provided in the embodiments of this application with reference to FIG. 1 to FIG. 5.

It should be noted that names of messages between network elements in the following embodiments of this application, names of parameters in the messages, or the like are merely examples, and may have other names during specific implementation. This is not specifically limited in the embodiments of this application.

Figure 6A:
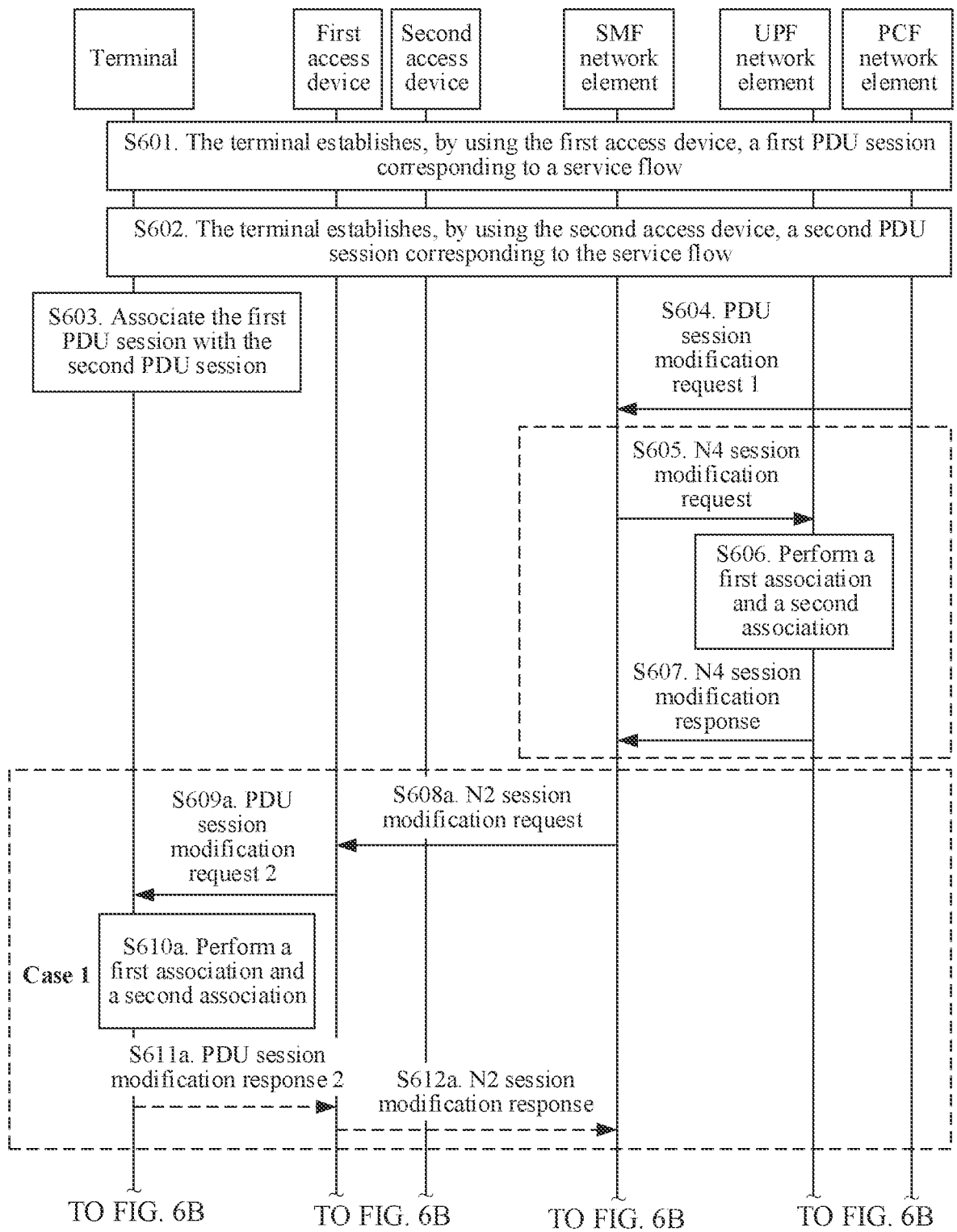
FIG. 6A and FIG. 6B are a first schematic flowchart of a quality of service monitoring method according to an embodiment of this application.
Figure 6B:
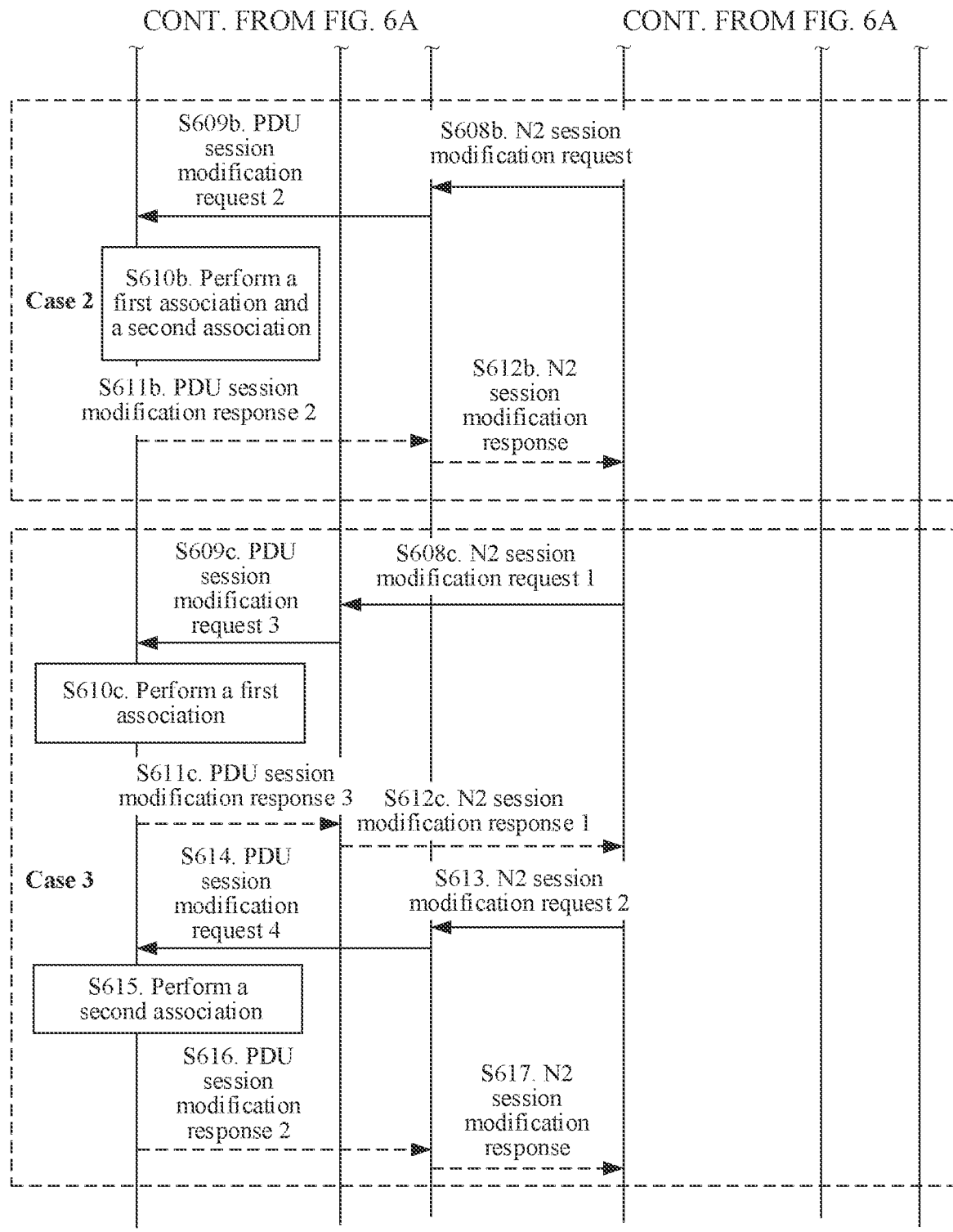

For example, the quality of service monitoring system shown in FIG. 3 is applied to the 5G network shown in FIG. 1. FIG. 6A and FIG. 6B show a quality of service monitoring method according to an embodiment of this application. The quality of service monitoring method includes the following steps.

S601. A terminal establishes, by using a first access device, a first PDU session corresponding to a service flow.

S602. The terminal establishes, by using a second access device, a second PDU session corresponding to the service flow.

For example, in this embodiment of this application, the first access device may be a RAN device, and the second access device may be an N3G-GW; or the first access device may be an N3G-GW, and the second access device may be a RAN device. This is not specifically limited in this embodiment of this application.

For specific implementation of step S601 and step S602, refer to an existing implementation, and details are not described herein.

S603. The terminal correlates the first PDU session with the second PDU session.

Optionally, in this embodiment of this application, that the terminal correlates the first PDU session with the second PDU session may be, for example, an identifier of the service flow of the terminal is shared between the first PDU session and the second PDU session, so that the service flow can be switched between the first PDU session and the second PDU session. For specific implementation, refer to an existing implementation, and details are not described herein.

S604. A PCF network element sends a PDU session modification request 1 to an SMF network element, so that the SMF network element receives the PDU session modification request 1 from the PCF network element.

The PDU session modification request 1 carries the identifier of the service flow on which a multi-link switching may be performed and a flow splitting policy corresponding to the identifier of the service flow, and the flow splitting policy is used to indicate that the service flow is allowed to be split on a first flow splitting link and a second flow splitting link.

For related descriptions of the flow splitting policy and the identifier of the service flow, refer to the foregoing embodiment part of the quality of service monitoring system, and details are not described herein again.

Optionally, the quality of service monitoring method provided in this embodiment of this application may further include steps S605 to S607.

S605. The SMF network element sends an N4 session modification request to a UPF network element, so that the IMF network element receives the N4 session modification request from the SMF network element.

The N4 session modification request carries the identifier of the service flow on which multi-link switching may be performed, a first quality of service monitoring parameter of the first flow splitting link for transmitting the service flow and first flow splitting link correlation information of the first flow splitting link, and a second quality of service monitoring parameter of the second flow splitting link for transmitting the service flow and second flow splitting link correlation information of the second flow splitting link.

In this embodiment of this application, for related descriptions of the service flow, the identifier of the service flow, the first quality of service monitoring parameter, the first flow splitting link correlation information, the second quality of service monitoring parameter, and the second flow splitting link correlation information, refer to the embodiment shown in FIG. 3, and details are not described herein again.

S606. The UPF network element correlates the identifier of the service flow; the first quality of service monitoring parameter, and the first flow splitting link correlation information; and the UPF network element correlates the identifier of the service flow, the second quality of service monitoring parameter, and the second flow splitting link correlation information.

It should be noted that, for ease of description, an correlation among the identifier of the service flow the first quality of service monitoring parameter, and corresponding flow splitting link correlation information (including the first flow splitting link correlation information in step S606 or third flow splitting link correlation information described below) may be referred to as a first correlation; and an correlation among the identifier of the service flow, the second quality of service monitoring parameter, and corresponding flow splitting link correlation information (including the second flow splitting link correlation information in step S606 or fourth flow splitting link correlation information described below) may be referred to as a second correlation. This is generally described herein, and details are not described below again.

Optionally, in this embodiment of this application, performing the first correlation may be, for example, storing or establishing a first correspondence among the identifier of the service flow, the first quality of service monitoring parameter, and the corresponding flow splitting link correlation information (including the first flow splitting link correlation information in step S606 or the third flow splitting link correlation information described below); and performing the second correlation may be, for example, storing or establishing a second correspondence among the identifier of the service flow, the second quality of service monitoring parameter, and the corresponding flow splitting link correlation information (including the second flow splitting link correlation information in step S606 or the fourth flow splitting link correlation information described below). This is generally described herein, and details are not described below again.

After the UPF network element performs the first correlation, the UPF network element may monitor quality of service of the first flow splitting link based on the first correspondence. After the UPF network element performs the second correlation, the UPF network element may monitor quality of service of the second flow splitting link based on the second correspondence. This is not specifically limited in this embodiment of this application.

For example, the UPF network element may learn, based on the flow splitting link correlation information and the identifier of the service flow in the first correspondence, that the quality of service of the first flow splitting link for transmitting the service flow is to be monitored. The UPF network element may learn of, based on the first quality of service monitoring parameter in the first correspondence, a specific monitoring parameter that is used to monitor the quality of service of the first flow splitting link. Therefore, in a scenario in which there are a plurality of available links for one service, the UPF network element may determine quality of service of a flow splitting link that needs to be monitored, to provide a policy basis for service switching on different flow splitting links.

S607. The UPF network element sends an N4 session modification response to the SMF network element, so that the SMF network element receives the N4 session modification response from the UPF network element.

Optionally, the quality of service monitoring method provided in this embodiment of this application may further include any one of the following three cases.

Case 1: Optionally, the quality of service monitoring method provided in this embodiment of this application may further include steps S608a to S612a.

S608a. The SMF network element sends an N2 session modification request to the first access device, so that the first access device receives the N2 session modification request from the SMF network element.

The N2 session modification request carries the identifier of the service flow, the first quality of service monitoring parameter, the first flow splitting link correlation information, the second quality of service monitoring parameter, and the second flow splitting link correlation information.

S609a. The first access device sends a PDU session modification request 2 to the terminal, so that the terminal receives the PDU session modification request 2 from the first access device.

The PDU session modification request carries the identifier of the service flow, the first quality of service monitoring parameter, the first flow splitting link correlation information, the second quality of service monitoring parameter, and the second flow splitting link correlation information.

S610a. This step is similar to step S606. A difference is, for example, the UPF network element in step S606 is replaced with the terminal. For related descriptions, refer to step S606, and details are not described herein again.

S611a. The terminal sends a PDU session modification response 2 to the first access device, so that the first access device receives the PDU session modification response 2 from the terminal.

S612a. The first access device sends an N2 session modification response to the SMF network element, so that the SMF network element receives the N2 session modification response from the first access device.

It should be noted that, in this embodiment of this application, step S611a and step S612a are optional steps. This is generally described herein, and details are not described below again.

Case 2: Optionally, the quality of service monitoring method provided in this embodiment of this application may further include steps S608b to S612b.

S608b to S612b: These steps are similar to steps S608a to S612a. A difference is, for example, the first access device in steps S608a to S612a is replaced with the second access device. For related descriptions, refer to steps S608a to S612a, and details are not described herein again.

Case 3: Optionally, the quality of service monitoring method provided in this embodiment of this application may further include steps S608c to S617.

S608c. The SMF network element sends an N2 session modification request 1 to the first access device, so that the first access device receives the N2 session modification request 1 from the SMF network element.

The N2 session modification request 1 carries the identifier of the service flow and the first quality of service monitoring parameter.

S609c. The first access device sends a PDU session modification request 3 to the terminal, so that the terminal receives the PDU session modification request 3 from the first access device.

The PDU session modification request 3 carries the identifier of the service flow and the first quality of service monitoring parameter.

S610c. The terminal correlates the identifier of the service flow, the first quality of service monitoring parameter, and the third flow splitting link correlation information.

Optionally, in this embodiment of this application, the third flow splitting link correlation information may be determined based on information about the first access device. In other words, the terminal may determine the third flow splitting link correlation information based on a status of the flow splitting link used for transmitting the PDU session modification request 3, and does not need to add information about the first flow splitting link to the PDU session modification request 3.

For related descriptions of the third flow splitting link correlation information, refer to the foregoing part of the quality of service monitoring system, and details are not described herein again.

Optionally, in this embodiment of this application, the PDU session modification request 3 may further carry the first flow splitting link correlation information, so that the terminal can correlate the identifier of the service flow, the first quality of service monitoring parameter, and the first flow splitting link correlation information. This is not specifically limited in this embodiment of this application.

Optionally, for a specific implementation in which the terminal performs the first correlation in this embodiment of this application, refer to step S606, and details are not described herein again.

After the terminal performs the first correlation, the terminal may monitor the quality of service of the first flow splitting link based on the first correspondence. For a related example, refer to step S606, and details are not described herein again.

S611c. The terminal sends a PDU session modification response 3 to the first access device, so that the first access device receives the PDU session modification response 3 from the terminal.

S612c. The first access device sends an N2 session modification response 1 to the SMF network element, so that the SMF network element receives the N2 session modification response 1 from the first access device.

It should be noted that, in this embodiment of this application, step S611a and step S612a are optional steps. This is generally described herein, and details are not described below again.

S613. The SMF network element sends an N2 session modification request 2 to the second access device, so that the second access device receives the N2 session modification request 2 from the SMF network element.

The N2 session modification request 2 carries the identifier of the service flow and the second quality of service monitoring parameter.

S614. The second access device sends a PDU session modification request 4 to the terminal, so that the terminal receives the PDU session modification request 4 from the second access device.

The PDU session modification request 4 carries the identifier of the service flow and the second quality of service monitoring parameter.

S615. The terminal correlates the identifier of the service flow, the second quality of service monitoring parameter, and the fourth flow splitting link correlation information.

Optionally, in this embodiment of this application, the fourth flow splitting link correlation information may be determined based on information about the second access device. In other words, the terminal may determine the fourth flow splitting link correlation information based on a status of the flow splitting link used for transmitting the PDU session modification request 4, and does not need to add information about the second flow splitting link to the PDU session modification request 4.

For related descriptions of the fourth flow splitting link correlation information, refer to the foregoing part of the quality of service monitoring system, and details are not described herein again.

Optionally, in this embodiment of this application, the PDU session modification request 4 may further carry the second flow splitting link correlation information, so that the terminal can correlate the identifier of the service flow, the first quality of service monitoring parameter, and the second flow splitting link correlation information. This is not specifically limited in this embodiment of this application.

Optionally, for a specific implementation in which the terminal performs the second correlation in this embodiment of this application, refer to step S606, and details are not described herein again.

S616. The terminal sends a PDU session modification response 4 to the second access device, so that the second access device receives the PDU session modification response 4 from the terminal.

S617. The second access device sends an N2 session modification response 2 to the SMF network element, so that the SMF network element receives the N2 session modification response 2 from the second access device.

It should be noted that, in this embodiment of this application, step S616 and step S617 are optional steps. This is generally described herein, and details are not described below again.

It should be noted that there is no necessary sequence of performing steps S608c to S612c and steps S613 to S617 in this embodiment of this application. Steps S608c to S612c may be performed before steps S613 to S617. Alternatively, steps S613 to S617 may be performed before steps S608c to S612c. Alternatively, steps S608c to S612c may be performed simultaneously with steps S613 to S617. This is not specifically limited in this embodiment of this application.

It should be noted that, if the quality, of service monitoring method provided in this embodiment of this application includes steps S605 to S607, and steps S608a to S612a, or steps S608b to S612b, or steps S608c to S617, there is no necessary sequence of performing steps S605 to S607 and steps S608a to S612a, or steps S608b to S612b, or steps S608c to S617. Steps S605 to S607 may be performed before steps S608a to S612a, steps S608a to S612b, or steps S608c to S617. Alternatively, steps S608a to S612a, or steps S608b to S612b, or steps S608c to S617 may be performed before steps S605 to S607. Alternatively, steps S608a to S612a, or steps S608b to S612b, or steps S608c to S617 may be performed simultaneously with steps S605 to S607. This is not specifically limited in this embodiment of this application.

According to the quality of service monitoring method provided in this embodiment of this application, in a multi-access scenario, in other words, in a scenario in which there are a plurality of available links for one service, quality of service of a multi-access link may be monitored, to provide a policy basis for service switching on different flow splitting links. For analysis on a related technical effect, refer to the foregoing part of the quality of service monitoring system, and details are not described herein again.

Actions of the SMF network element, the UPF network element, or the terminal in steps S601 to S617 may be performed by the processor 501 in the communications device 500 shown in FIG. 5 by invoking the application program code stored in the memory 503. This is not limited in this embodiment.

Figure 7A:
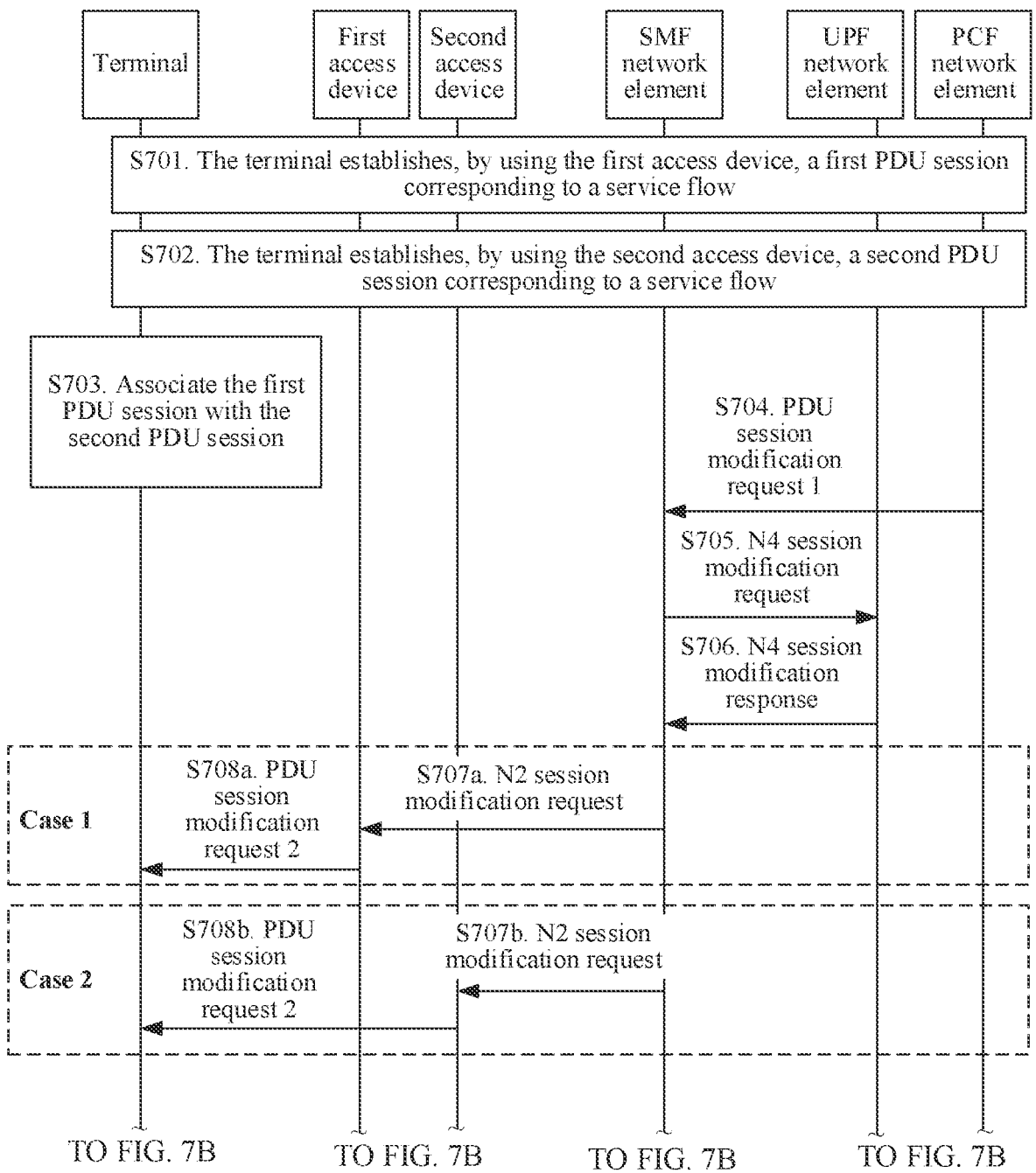
FIG. 7A and FIG. 7B are a second schematic flowchart of a quality of service monitoring method according to an embodiment of this application.
Figure 7B:
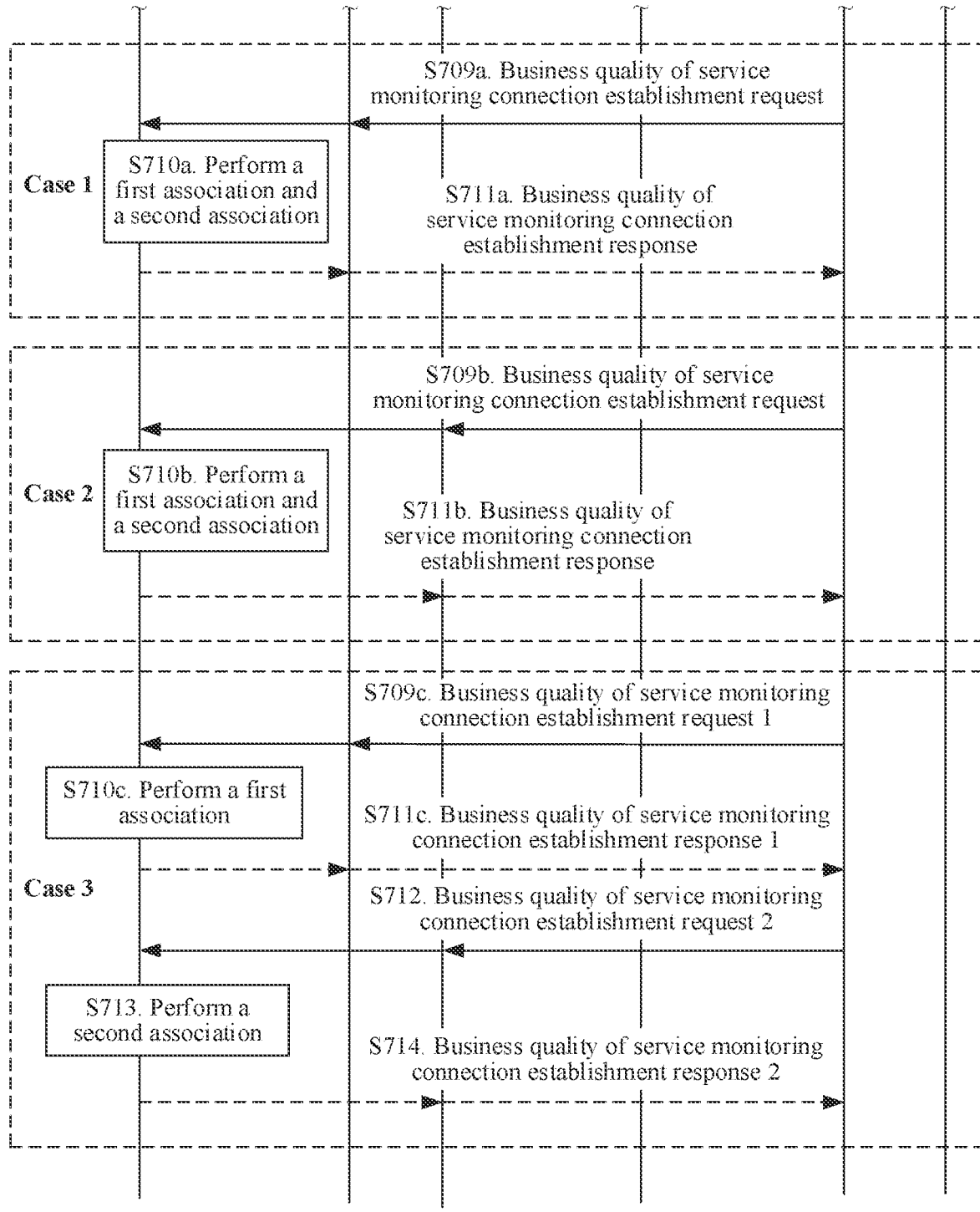

For example, the quality of service monitoring system shown in FIG. 4 is applied to the 5G network shown in FIG. 1. FIG. 7A and FIG. 7B show a quality of service monitoring method according to an embodiment of this application. The quality of service monitoring method includes the following steps.

S701 to S704: These steps are similar to steps S601 to S604. For related descriptions, refer to the embodiment shown in FIG. 6A and FIG. 6B, and details are not described again herein.

S705. The SMF network element sends an N4 session modification request to a UPF network element, so that the UPF network element receives the N4 session modification request from the SMF network element.

The N4 session modification request carries the identifier of the service flow and the flow splitting policy corresponding to the identifier of the service flow.

S706. The UPF network element sends an N4 session modification response to the SMF network element, so that the SMF network element receives the N4 session modification response from the UPF network element.

The quality of service monitoring method provided in this embodiment of this application may further include either of the following two cases.

Case 1: Optionally, the quality of service monitoring method provided in this embodiment of this application may further include steps S707a and S708a.

S707a. The SMF network element sends an N2 session modification request to the first access device, so that the first access device receives the N2 session modification request from the SMF network element.

The N2 session modification request carries the identifier of the service flow and the flow splitting policy corresponding to the identifier of the service flow.

S708a. The first access device sends a PDU session modification request 2 to the terminal, so that the terminal receives the PDU session modification request 2 from the first access device.

The PDU session modification request 2 carries the identifier of the service flow and the flow splitting policy corresponding to the identifier of the service flow, so that the terminal can store the identifier of the service flow and the corresponding flow splitting policy. Therefore, the terminal may subsequently split the service flow according to the flow splitting policy. This is not specifically limited in this embodiment of this application.

Case 2: Optionally, the quality of service monitoring method provided in this embodiment of this application may further include steps S707b and S708b.

S707b and S708b: These steps are similar to steps S607a and S608a. A difference is, for example, the first access device in steps S607a and S608a is replaced with the second access device. For related descriptions, refer to steps S607a and S608a, and details are not described herein again.

The quality of service monitoring method provided in this embodiment of this application may further include any one of the following three cases.

Case 1: Optionally, the quality of service monitoring method provided in this embodiment of this application may further include steps S709a to S711a.

S709a. The UPF network element sends a quality of service monitoring connection establishment request to the terminal by using the first access device, so that the terminal receives the quality of service monitoring connection establishment request from the UPF network element by using the first access device.

The quality of service monitoring connection establishment request carries the identifier of the service flow, the first quality of service monitoring parameter, the first flow splitting link correlation information, the second quality of service monitoring parameter, and the second flow splitting link correlation information.

S710a. This step is similar to S610a. For related descriptions, refer to the embodiment shown in FIG. 6A and FIG. 6B, and details are not described again herein.

S711a. The terminal sends a quality of service monitoring connection establishment response to the UPF network element by using the first access device, so that the UPF network element receives the quality of service monitoring connection establishment response from the terminal by using the first access device.

It should be noted that, in this embodiment of this application, step S711a is an optional step. This is generally described herein, and details are not described below again.

Case 2: Optionally, the quality of service monitoring method provided in this embodiment of this application may further include steps S709b to S711b.

S709b to S711b: These steps are similar to steps S709a to S711a. A difference is, for example, the first access device in steps S709a to S711a is replaced with the second access device. For related descriptions, refer to steps S709a to S711a, and details are not described herein again.

Case 3: Optionally, the quality of service monitoring method provided in this embodiment of this application may further include steps S709c to S714.

S709c. The UPF network element sends a quality of service monitoring connection establishment request 1 to the terminal by using the first access device, so that the terminal receives the quality of service monitoring connection establishment request 1 from the UPF network element by using the first access device.

The quality of service monitoring connection establishment request 1 carries the identifier of the service flow and the first quality of service monitoring parameter.

S710c. This step is similar to step S610c. For related descriptions, refer to the embodiment shown in FIG. 6A and FIG. 6B, and details are not described again herein.

S711c. The terminal sends a quality of service monitoring connection establishment response 1 to the UPF network element by using the first access device, so that the UPF network element receives the quality of service monitoring connection establishment response 1 from the terminal by using the first access device.

It should be noted that, in this embodiment of this application, step S711c is an optional step. This is generally described herein, and details are not described below again.

S712. The UPF network element sends a quality of service monitoring connection establishment request 2 to the terminal by using the second access device, so that the terminal receives the quality of service monitoring connection establishment request 2 from the UPF network element by using the second access device.

The quality of service monitoring connection establishment request 2 carries the identifier of the service flow and the second quality of service monitoring parameter.

S713. This step is similar to step S615. For related descriptions, refer to the embodiment shown in FIG. 6A and FIG. 6B, and details are not described again herein.

S714. The terminal sends a quality of service monitoring connection establishment response 2 to the UPF network element by using the second access device, so that the UPF network element receives the quality of service monitoring connection establishment response 2 from the terminal by using the second access device.

It should be noted that, in this embodiment of this application, step S714 is an optional step. This is generally described herein, and details are not described below again.

It should be noted that there is no necessary sequence of performing steps S709c to S711c and steps S712 to S714 in this embodiment of this application. Steps S709c to S711c may be performed before steps S712 to S714. Alternatively, steps S712 to S714 may be performed before steps S709c to S711c. Alternatively, steps S709c to S711c may be performed simultaneously with steps S712 to S714. This is not specifically limited in this embodiment of this application.

According to the quality of service monitoring method provided in this embodiment of this application, in a multi-access scenario, in other words, in a scenario in which there are a plurality of available links for one service, quality of service of a multi-access link may be monitored, to provide a policy basis for service switching on different flow splitting links. For analysis on a related technical effect, refer to the foregoing part of the quality of service monitoring system, and details are not described herein again.

Actions of the SMF network element, the UPF network element, or the terminal in steps S701 to S714 may be performed by the processor 501 in the communications device 500 shown in FIG. 5 by invoking the application program code stored in the memory 503. This is not limited in this embodiment.

Figure 8A:
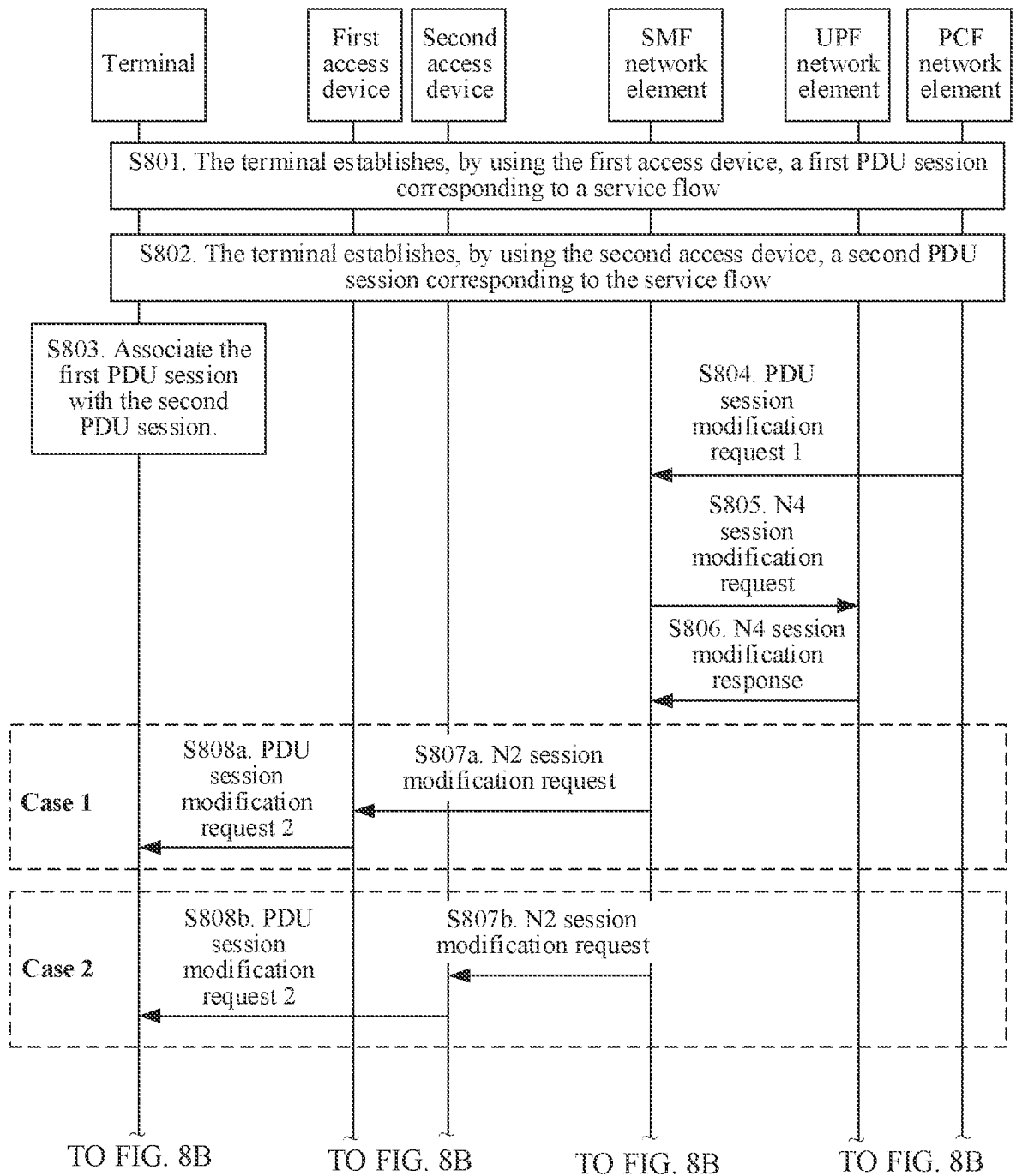
FIG. 8A and FIG. 8B are a third schematic flowchart of a quality of service monitoring method according to an embodiment of this application.
Figure 8B:
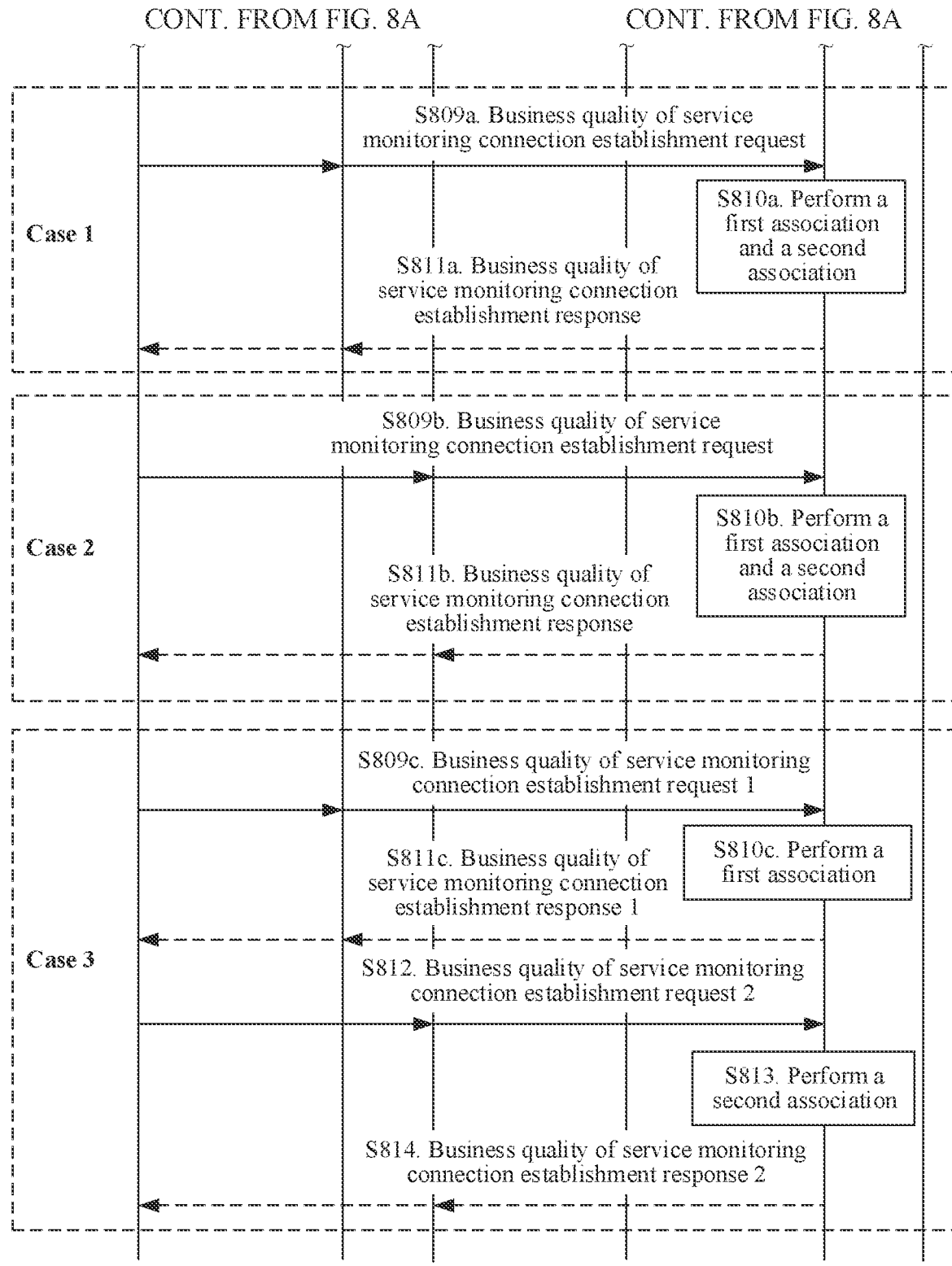

For example, the quality of service monitoring system shown in FIG. 4 is applied to the 5G network shown in FIG. 1. FIG. 8A and FIG. 8B show a quality of service monitoring method according to an embodiment of this application. The quality of service monitoring method includes the following steps.

S801 to S808b: These steps are similar to steps S701 to S707b. For related descriptions, refer to the embodiment shown in FIG. 7A and FIG. 7B, and details are not described again herein.

The quality of service monitoring method provided in this embodiment of this application may further include any one of the following three cases.

Case 1: Optionally, the quality of service monitoring method provided in this embodiment of this application may further include steps S809a to S811a.

S809a to S811a: These steps are similar to steps S709a to S711a. A difference is, for example, the terminal in steps S709a to S711a is replaced with the UPF network element, and the UPF network element in steps S709a to S711a is replaced with the terminal. For related descriptions, refer to steps S709a, to S711a, and details are not described herein again.

Case 2: Optionally, the quality of service monitoring method provided in this embodiment of this application may further include steps S809b to S811b.

S809b to S811b: These steps are similar to steps S709a, to S711b. A difference is, for example, the terminal in steps S709b to S711b is replaced with the UPF network element, and the UPF network element in steps S709b to S711b is replaced with the terminal. For related descriptions, refer to steps S709b to S711b, and details are not described herein again.

Case 3: Optionally, the quality of service monitoring method provided in this embodiment of this application may further include steps S809c to S814.

S809c to S814: These steps are similar to steps S709c to S714. A difference is, for example, the terminal in steps S709c to S714 is replaced with the UPF network element, and the UPF network element in steps S709c to S714 is replaced with the terminal. For related descriptions, refer to steps S709c to S714, and details are not described herein again.

According to the quality of service monitoring method provided in this embodiment of this application, in a multi-access scenario, in other words, in a scenario in which there are a plurality of available links for one service, quality of service of a multi-access link may be monitored, to provide a policy basis for service switching on different flow splitting links. For analysis on a related technical effect, refer to the foregoing part of the quality of service monitoring system, and details are not described herein again.

Actions of the SMF network element, the UPF network element, or the terminal in steps S801 to S814 may be performed by the processor 501 in the communications device 500 shown in FIG. 5 by invoking the application program code stored n the memory 503. This is not limited it in this embodiment.

An example in which establishment of a first quality of service monitoring connection corresponding to a first flow splitting link and establishment of a second quality of service monitoring connection corresponding to a second flow splitting link are simultaneously initiated is used to describe FIG. 5 to FIG. 7A and FIG. 7B. Optionally, in the embodiments of this application, the first quality of service monitoring connection corresponding to the first flow splitting link may be first established according to a method similar to the foregoing method. Further, after it is determined, according to a policy, that a service flow needs to be split to the second flow splitting link, the second quality of service monitoring connection corresponding to the second flow splitting link is established according to a method similar to the foregoing method. This is not specifically limited in the embodiments of this application.

In addition, optionally, in the foregoing embodiments of this application, an example in which a service flow is split on a first flow splitting link and a second flow splitting link is used for description. Certainly, the service flow may alternatively be split on more than two flow splitting links. For example, the service flow is split on the first flow splitting link, the second flow splitting link, and a third flow splitting link. In this case, for a manner of establishing a quality of service monitoring connection corresponding to each flow splitting link, refer to the foregoing embodiments shown in FIG. 5 to FIG. 7A and FIG. 7B, and details are not described herein again.

The solutions provided in the embodiments of this application are mainly described from the perspective of interaction between network elements. It can be understood that, to implement the foregoing functions, the communications device or the first packet processing device includes corresponding hardware structures and/or software modules for performing the foregoing functions. A person of ordinary skill in the art should be easily aware that, in combination with the examples described in the embodiments disclosed in this specification, units and algorithm steps may be implemented by hardware or a combination of hardware and computer software in this application. Whether a specific function is performed by hardware or hardware driven by computer software depends on particular applications and design constraints of the technical solutions. A person skilled in the art may use different methods to implement the described functions for each particular application, but it should not be considered that the implementation goes beyond a scope of this application.

In the embodiments of this application, function modules of the communications device or the first packet processing device may be obtained through division based on the foregoing method examples. For example, the function modules may be obtained through division based on corresponding functions, or two or more functions may be integrated into one processing module. The foregoing integrated module may be implemented in a form of hardware, or may be implemented in a form of a software function module. It should be noted that, in the embodiments of this application, module division is an example and is merely logical function division, and may be other division during actual implementation.

Figure 9:
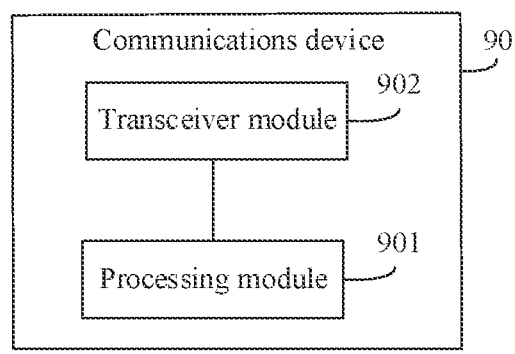
FIG. 9 is a schematic structural diagram of a communications device according to an embodiment of this application.

For example, in a case in which the function modules are obtained through division in an integration manner, FIG. 9 is a schematic structural diagram of a communications device 90. The communications device 90 includes a processing module 901 and a transceiver module 902. The processing module 901 is configured to obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. The transceiver module 902 is configured to initiate, based on the identifier of the service flow, the first quality of service monitoring parameter, the first flow splitting link correlation information, the second quality of service monitoring parameter, and the second flow splitting link correlation information, establishment of a first quality of service monitoring connection corresponding to the first flow splitting link and a second quality of service monitoring connection corresponding to the second flow splitting link.

Optionally, the communications device 90 is a session management network element. Correspondingly, that the processing module 901 is configured to obtain an identifier of a service flow of a terminal includes: receiving a first message from a policy control network element, where the first message carries the identifier of the service flow and a flow splitting policy corresponding to the identifier of the service flow, and the flow splitting policy is used to indicate that the service flow is allowed to be split on the first flow splitting link and the second flow splitting link; and that the processing module 901 is configured to obtain first flow splitting link correlation information of the first flow splitting link, and second flow splitting link correlation information of the second flow splitting link includes: determining the first flow splitting link correlation information of the first flow splitting link, and the second flow splitting link correlation information of the second flow splitting link.

In a possible implementation, the communications device 90 is the session management network element. The transceiver module 902 is specifically configured to send the identifier of the service flow, the first quality of service monitoring parameter, the first flow splitting link correlation information, the second quality of service monitoring parameter, and the second flow splitting link correlation information to a user plane function network element.

Alternatively, the transceiver module 902 is specifically configured to send the identifier of the service flow, the first quality of service monitoring parameter, the first flow splitting link correlation information, the second quality of service monitoring parameter, and the second flow splitting link correlation information to the terminal by using a first access device corresponding to the first flow splitting link or a second access device corresponding to the second flow splitting link, where the identifier of the service flow, the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link.

In another possible implementation, the communications device 90 is the session management network element. The transceiver module 902 is specifically configured to send the identifier of the service flow, the first quality of service monitoring parameter, the first flow splitting link correlation information, the second quality of service monitoring parameter, and the second flow splitting link correlation information to a user plane function network element, where the identifier of the service flow, the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link.

Alternatively, the transceiver module 902 is specifically configured to: send the identifier of the service flow and the first quality of service monitoring parameter to the terminal based on the first flow splitting link correlation information by using a first access device corresponding to the first flow splitting link, where the identifier of the service flow and the first quality of service monitoring parameter are used to monitor quality of service of the first flow splitting link; and send the identifier of the service flow and the second quality of service monitoring parameter to the terminal based on the second flow splitting link correlation information by using a second access device corresponding to the second flow splitting link, where the identifier of the service flow and the second quality of service monitoring parameter are used to monitor quality of service of the second flow splitting.

Optionally, the communications device includes the terminal or a user plane function network element. Correspondingly, that the processing module 901 is configured to obtain an identifier of a service flow of a terminal includes: receiving a second message from a session management network element, where the second message carries the identifier of the service flow and a flow splitting policy corresponding to the identifier of the service flow, and the flow splitting policy is used to indicate that the service flow is allowed to be split on the first flow splitting link and the second flow splitting link; and that the processing module 901 is configured to obtain first flow splitting link correlation information of the first flow splitting link, and second flow splitting link correlation information of the second flow splitting link includes: determining the first flow splitting link correlation information of the first flow splitting link, and the second flow splitting link correlation information of the second flow splitting link.

In a possible implementation, the communications device is the user plane function network element, and the transceiver module 902 is specifically configured to send the identifier of the service flow, the first quality of service monitoring parameter, the first flow splitting link correlation information, the second quality of service monitoring parameter, and the second flow splitting link correlation information to the terminal by using a first access device corresponding to the first flow splitting link or a second access device corresponding to the second flow splitting link, where the identifier of the service flow, the first quality of service monitoring parameter, and the first flow splitting link correlation information are used to monitor quality of service of the first flow splitting link; and the identifier of the service flow, the second quality of service monitoring parameter, and the second flow splitting link correlation information are used to monitor quality of service of the second flow splitting link.

In another possible implementation, the communications device is the user plane function network element, and the transceiver module 902 is specifically configured to: send the identifier of the service flow and the first quality of service monitoring parameter to the terminal based on the first flow splitting link correlation information by using a first access device corresponding to the first flow splitting link, where the identifier of the service flow and the first quality of service monitoring parameter are used to monitor quality of service of the first flow splitting link; and send the identifier of the service flow and the second quality of service monitoring parameter to the terminal based on the second flow splitting link correlation information by using a second access device corresponding to the second flow splitting link, where the identifier of the service flow and the second quality of service monitoring parameter are used to monitor quality of service of the second flow splitting link.

In still another possible implementation, the communications device is the terminal, and the transceiver module 902 is specifically configured to send the identifier of the service flow, the first quality of service monitoring parameter, the first flow splitting link correlation information, the second quality of service monitoring parameter, and the second flow splitting link correlation information to a user plane function network element by using a first access device corresponding to the first flow splitting link or a second access device corresponding to the second flow splitting link, where the identifier of the service flow, the first quality of service monitoring parameter, and the first flow splitting link correlation information are used to monitor quality of service of the first flow splitting link; and the identifier of the service flow; the second quality of service monitoring parameter, and the second flow splitting link correlation information are used to monitor quality of service of the second flow splitting link.

In still another possible implementation, the communications device is the terminal, and the transceiver module 902 is specifically configured to: send the identifier of the service flow and the first quality of service monitoring parameter to a user plane function network element based on the first flow splitting link correlation information by using a first access device corresponding to the first flow splitting link, where the identifier of the service flow and the first quality of service monitoring parameter are used to monitor quality of service of the first flow splitting link; and send the identifier of the service flow and the second quality of service monitoring parameter to the user plane function network element based on the second flow splitting link correlation information by using a second access device corresponding to the second flow splitting link, where the identifier of the service flow and the second quality of service monitoring parameter are used to monitor quality of service of the second flow splitting link.

All related content of the steps in the foregoing method embodiments may be cited in function descriptions of corresponding function modules, and details are not described herein again.

In this embodiment, the communications device 90 is presented with the function modules obtained through division in an integration manner. The "module" herein may be a specific ASIC, a circuit, a processor executing one or more software or firmware programs, a memory, an integrated logic circuit, and/or another device that can provide the foregoing functions. In a simple embodiment, a person skilled in the art may figure out that the communications device 90 may use the form shown in FIG. 5.

For example, the processor 501 in FIG. 5 may invoke the computer-executable instruction stored in the memory 503, so that the communications device 90 performs the quality of service monitoring method in the foregoing method embodiment.

Specifically, the functions/implementation processes of the processing module 901 and the transceiver module 902 in FIG. 9 may be implemented by the processor 501 in FIG. 5 by invoking the computer-executable instruction stored in the memory 503. Alternatively, the functions/implementation processes of the transceiver module 902 in FIG. 9 may be implemented by the communications interface 504 in FIG. 5, and the functions/implementation processes of the processing module 901 in FIG. 9 may be implemented by the processor 501 in FIG. 5 by invoking the computer-executable instruction stored in the memory 503.

The communications device 90 provided in this embodiment may perform the foregoing quality of service monitoring method. Therefore, for technical effects that can be achieved by the communications device 90, refer to the foregoing method embodiment, and details are not described herein again.

Optionally, an embodiment of this application further provides a chip system. The chip system includes a processor, configured to support a communications device in implementing the foregoing quality of service monitoring method, for example, obtaining an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. In a possible design, the chip system further includes a memory. The memory is configured to store a program instruction and data that are necessary for the communications device. Certainly, the memory may alternatively not be in the chip system. The chip system may include a chip, or may include a chip and another discrete device. This is not specifically limited in this embodiment of this application.

Figure 10:
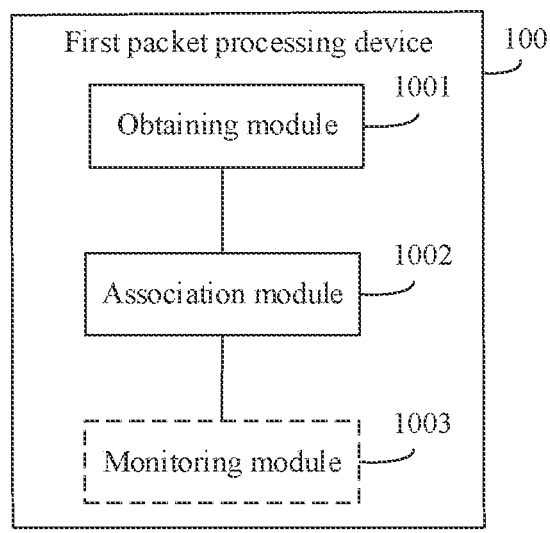
FIG. 10 is a schematic structural diagram of a first packet processing device according to an embodiment of this application.

For example, in a case in which the function modules are obtained through division in an integration manner, FIG. 10 is a schematic structural diagram of a first packet processing device 100. The first packet processing device 100 includes an obtaining module 1001 and a correlation module 1002. The obtaining module 1001 is configured to obtain an identifier of a service flow of a terminal, a first quality of service monitoring parameter of a first flow splitting link for transmitting the service flow and first flow splitting link correlation information of the first flow splitting link, and a second quality of service monitoring parameter of a second flow splitting link for transmitting the service flow and second flow splitting link correlation information of the second flow splitting link. The correlation module 1002 is configured to: correlate the identifier of the service flow, the first quality of service monitoring parameter, and the first flow splitting link correlation information; and correlate the identifier of the service flow, the second quality of service monitoring parameter, and the second flow splitting link correlation information.

Optionally, the obtaining module 1001 is specifically configured to receive the identifier of the service flow, the first quality of service monitoring parameter, the first flow splitting link correlation information, the second quality of service monitoring parameter, and the second flow splitting link correlation information from a session management network element.

Alternatively, optionally, the obtaining module 1001 is specifically configured to receive the identifier of the service flow, the first quality of service monitoring parameter, the first flow splitting link correlation information, the second quality of service monitoring parameter, and the second flow splitting link correlation information from a second packet processing device by using a first access device corresponding to the first flow splitting link or a second access device corresponding to the second flow splitting link.

Alternatively, optionally, the obtaining module 1001 is specifically configured to: receive the identifier of the service flow and the first quality of service monitoring parameter from a second packet processing device by using a first access device corresponding to the first flow splitting link, and determine the first flow splitting link correlation information based on information about the first access device; and receive the identifier of the service flow and the second quality of service monitoring parameter from the second packet processing device by using a second access device corresponding to the second flow splitting link, and determine the second flow splitting link correlation information based on information about the second access device.

Optionally, that the correlation module 1002 is configured to correlate the identifier of the service flow, the first quality of service monitoring parameter, and the first flow splitting link correlation information includes: storing a correspondence among the identifier of the service flow, the first quality of service monitoring parameter, and the first flow splitting link correlation information.

Optionally, that the correlation module 1002 correlates the identifier of the service flow, the second quality of service monitoring parameter, and the second flow splitting link correlation information includes: storing a correspondence among the identifier of the service flow, the second quality of service monitoring parameter, and the second flow splitting link correlation information.

Optionally, as shown in FIG. 10, the first packet processing device 100 further includes a monitoring module 1003. The monitoring module 1003 is configured to monitor quality of service of the first flow splitting link based on the identifier of the service flow, the first quality of service monitoring parameter, and the first flow splitting link correlation information; or the monitoring module 1003 is configured to monitor quality of service of the second flow splitting link based on the identifier of the service flow, the second quality of service monitoring parameter, and the second flow splitting link correlation information.

All related content of the steps in the foregoing method embodiments may be cited in function descriptions of corresponding function modules, and details are not described herein again.

In this embodiment, the first packet processing device 100 is presented with the function modules obtained through division in an integration manner. The "module" herein may be a specific ASIC, a circuit, a processor executing one or more software or firmware programs, a memory, an integrated logic circuit, and/or another device that can provide the foregoing function. In a simple embodiment, a person skilled in the art may figure out that the communications device 90 may use the form shown in FIG. 5.

For example, the processor 501 in FIG. 5 may invoke the computer-executable instruction stored in the memory 503, so that the first packet processing device 100 performs the quality of service monitoring method in the foregoing method embodiment.

Specifically, the functions/implementation on processes of the obtaining module 1001, the correlation module 1002, and the monitoring module 1003 in FIG. 10 may be implemented by the processor 501 in FIG. 5 by invoking the computer-executable instruction stored in the memory 503.

The first packet processing device 100 provided in this embodiment may perform the foregoing quality of service monitoring method. Therefore, for technical effects that can be achieved by the first packet processing device 100, refer to the foregoing method embodiment, and details are not described herein again.

Optionally, an embodiment of this application further provides a chip system. The chip system includes a processor, configured to support a first packet processing device in implementing the foregoing quality of service monitoring method, for example, correlating an identifier of a service flow, a first quality of service monitoring parameter, and first flow splitting link correlation information; and correlating the identifier of the service flow, a second quality of service monitoring parameter, and second flow splitting link correlation information. In a possible design, the chip system further includes a memory. The memory is configured to store a program instruction and data that are necessary for the first packet processing device. Certainly, the memory may alternatively not be in the chip system. The chip system may include a chip, or may include a chip and another discrete device. This is not specifically limited in this embodiment of this application.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described herein with reference to the embodiments, in a process of implementing this application that claims protection, a person skilled in the art may understand and implement another variation of the disclosed embodiments by viewing the accompanying drawings, disclosed content, and appended claims. In the claims, "comprising" does not exclude another component or another step, and "a" or "one" does not exclude a meaning of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, it is apparent that various modifications and combinations may be made to them without departing from the spirit and scope of this application. Correspondingly, this specification and the accompanying drawings are merely examples for description of this application defined by the appended claims, and are considered as any or all of modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A quality of service monitoring method, comprising:
    obtaining, by a communication device, an identifier of a service flow of a terminal device, a quality of service monitoring parameter of a communication link for transmitting the service flow, and correlation information associated with the communication link, the correlation information correlates the identifier of the service flow with an access type adopted by the communication link, wherein the access type is a 3rd generation partnership project (3GPP) access or a non-3GPP access; and
    monitoring, by the communication device, a quality of service of the communication link for the access type based on the identifier of the service flow, the quality of service monitoring parameter, and the correlation information.

2. The method according to claim 1, wherein the communication device is a terminal device or a user plane function network element.

3. The method according to claim 1, wherein the identifier of the service flow is a 5-tuple.

4. The method according to claim 1, wherein the correlation information comprises a tunnel identifier corresponding to the communication link.

5. The method according to claim 1, wherein the correlation information further correlates the access type to one or more of a session identifier corresponding to the communication link, the quality of service monitoring parameter, or a monitoring identifier corresponding to the communication link.

6. The method according to claim 1, further comprising:
    before the monitoring the quality of service of the communication link, determining, based on the correlation information and the identifier of the service flow, that the quality of service of the communication link is to be monitored; and
    the monitoring the quality of service of the communication link is performed based on the quality of service monitoring parameter.

7. An apparatus, comprising:
    at least one processor; and
    a memory coupled to the at least one processor and storing executable instructions for execution by the at least one processor, the executable instructions instruct the at least one processor to:
    obtain an identifier of a service flow of a terminal device, a quality of service monitoring parameter of a communication link for transmitting the service flow, and correlation information associated with the communication link, the correlation information correlates the identifier of the service flow with an access type adopted by the communication link, wherein the access type is a 3rd generation partnership project (3GPP) access or a non-3GPP access; and
    monitor a quality of service of the communication link for the access type based on the identifier of the service flow, the quality of service monitoring parameter, and the correlation information.

8. The apparatus according to claim 7, wherein the apparatus is a terminal device or a user plane function network element.

9. The apparatus according to claim 7, wherein the identifier of the service flow is a 5-tuple.

10. The apparatus according to claim 7, wherein the correlation information comprises a tunnel identifier corresponding to the communication link.

11. The apparatus according to claim 7, wherein the correlation information further correlates the access type to one or more of a session identifier corresponding to the communication link, the quality of service monitoring parameter, or a monitoring identifier corresponding to the communication link.

12. The apparatus according to claim 7, the executable instructions further instruct the at least one processor to:
    before the monitoring the quality of service of the communication link, determine, based on the correlation information and the identifier of the service flow, that the quality of service of the communication link is to be monitored; and
    the monitoring the quality of service of the communication link is performed based on the quality of service monitoring parameter.

13. A non-transitory computer readable storage medium, comprising one or more instructions executable by a communication device to perform operations comprising:

obtaining an identifier of a service flow of a terminal device, a quality of service monitoring parameter of a communication link for transmitting the service flow, and correlation information associated with the communication link, the correlation information correlates the identifier of the service flow with an access type adopted by the communication link, wherein the access type is a 3rd generation partnership project (3GPP) access or a non-3GPP access; and monitoring a quality of service of the communication link for the access type based on the identifier of the service flow, the quality of service monitoring parameter, and the correlation information.

14. The non-transitory computer readable storage medium according to claim 13, wherein the identifier of the service flow is a 5-tuple.

15. The non-transitory computer readable storage medium according to claim 13, wherein the correlation information comprises a tunnel identifier corresponding to the communication link.

16. The method according to claim 1, wherein the quality of service monitoring parameter comprises: a sending period of a monitoring packet, a quality of service parameter to be monitored, a reporting threshold, a sending time of the monitoring packet, or a sending sequence number of the monitoring packet, and wherein the monitoring packet is a packet sent for the monitoring of the quality of service of the communication link.

17. The apparatus according to claim 7, wherein the quality of service monitoring parameter comprises: a sending period of a monitoring packet, a quality of service parameter to be monitored, a reporting threshold, a sending time of the monitoring packet, or a sending sequence number of the monitoring packet, and wherein the monitoring packet is a packet sent for the monitoring of the quality of service of the communication link.

18. The non-transitory computer readable medium according to claim 13, wherein the communication device is a terminal device or a user plane function network element.

19. The method according to claim 1, wherein the identifier of the service flow comprises one or more of a source internet protocol (IP) address, a destination IP address, a source port number, a destination port number, or a transport layer protocol number.

20. The apparatus according to claim 7, wherein the identifier of the service flow comprises one or more of a source internet protocol (IP) address, a destination IP address, a source port number, a destination port number, or a transport layer protocol number.

* * * * *